United States Patent [19]

Taylor

[11] Patent Number: 5,116,096
[45] Date of Patent: May 26, 1992

[54] TRUCK CARGO SUPPORT OUTRIGGER

[76] Inventor: George F. Taylor, 314 Rocky Creek Rd., Hampton, Ga. 30228

[21] Appl. No.: 504,122

[22] Filed: Apr. 3, 1990

[51] Int. Cl.⁵ ............................................. B62D 33/02
[52] U.S. Cl. ......................................... 296/3; 296/26; 280/415.1; 280/769; 172/439
[58] Field of Search ................ 296/3, 26, 37.6, 50, 296/57.1, 165, 183; 280/415.1, 760, 769; 172/439, 443, 817

[56] References Cited

U.S. PATENT DOCUMENTS

| | | | |
|---|---|---|---|
| 2,527,613 | 10/1950 | Zagurski | 172/439 X |
| 4,023,850 | 5/1977 | Tillery | 296/26 |
| 4,856,840 | 8/1989 | Hanley | 296/26 |
| 4,932,703 | 6/1990 | Chamberlin et al. | 296/26 |

FOREIGN PATENT DOCUMENTS 1222002  5/1987  Canada .................... 296/26

Primary Examiner—Margaret A. Focarino
Assistant Examiner—Andrew C. Pike

[57] ABSTRACT

A rigid pickup truck cargo supporting V shaped frame comprises necessary structural members to hole it in a V shape and to allow its narrow end frame work to be coupled to the rear of a pickup truck, below the cargo bed level, per the pickup truck's standard type trailer hitch coupler bail. The wider portion of the V shaped frame extends a number of feet rearward in a slight upward slope away from the pickup truck's rear end. A long member attached crossways at the wide end of the V shaped frame provides a cargo load carrying surface. The V shaped frame is supported and made laterally stable by a square like frame which can be attached crossways at any of several points along the more forward or more narrow section of the V shaped frame. The square like frame extends up vertically from the V shaped frame to the lowered pickup truck tailgate. The long horizontal upper member of the square like frame rest on the lowered pickup truck tailgate for support. The upper section of the square like frame can be rotated rearward to dismount it from the pickup truck tailgate. The long horizontal upper member of the square like frame is held against the pickup truck tailgate per the use of a ⅝"×6" bolt screwed through a small box like frame that is mounted, along with its other related parts, to a rigid member of the V shaped frame.

1 Claim, 14 Drawing Sheets

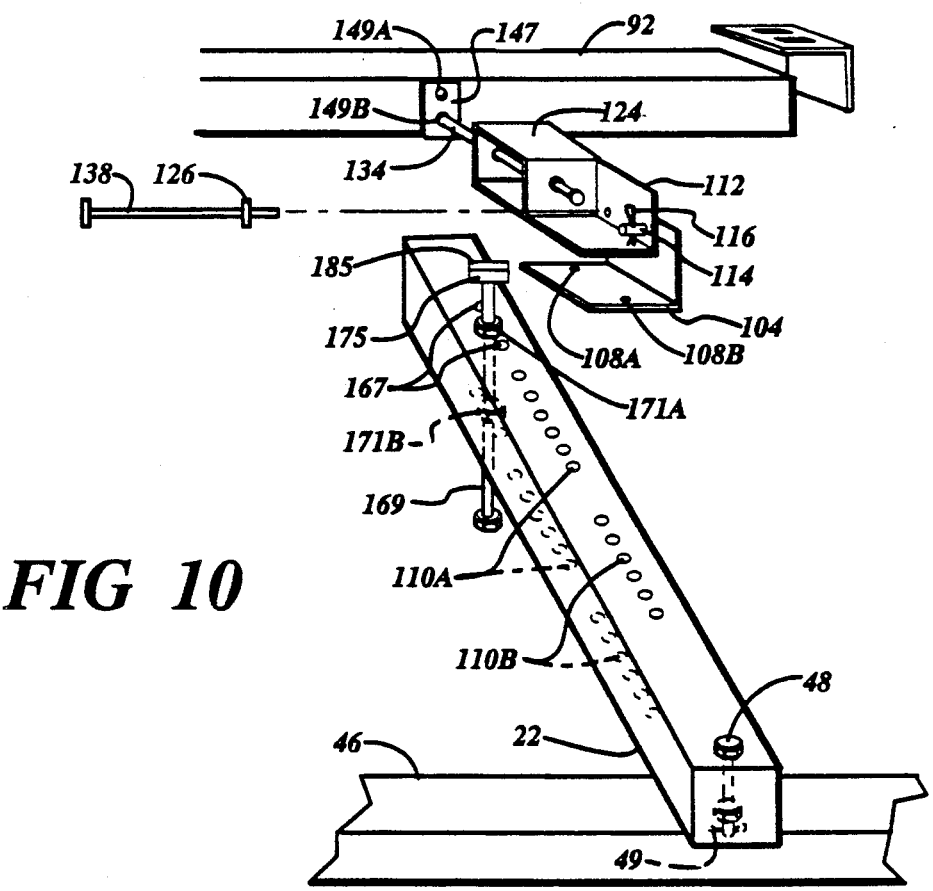
FIG 10
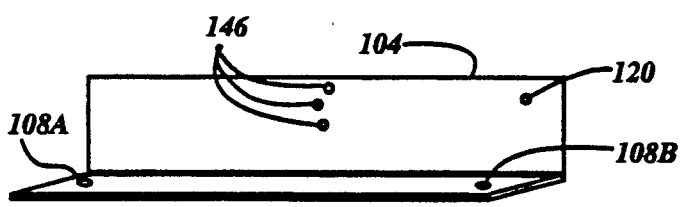
FIG 11
FIG 12
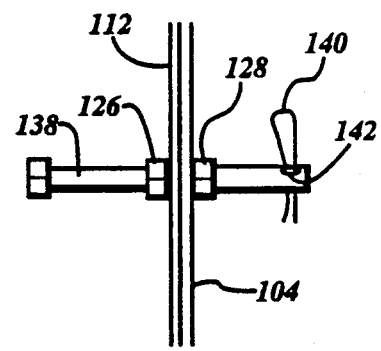
FIG 13

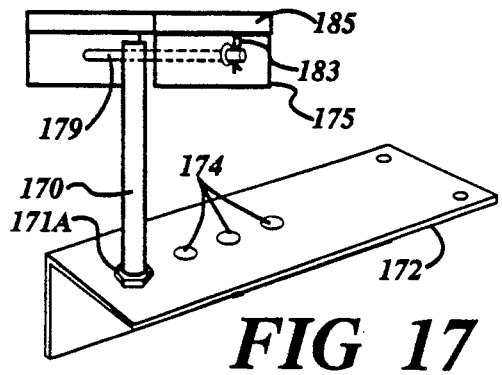
FIG 17
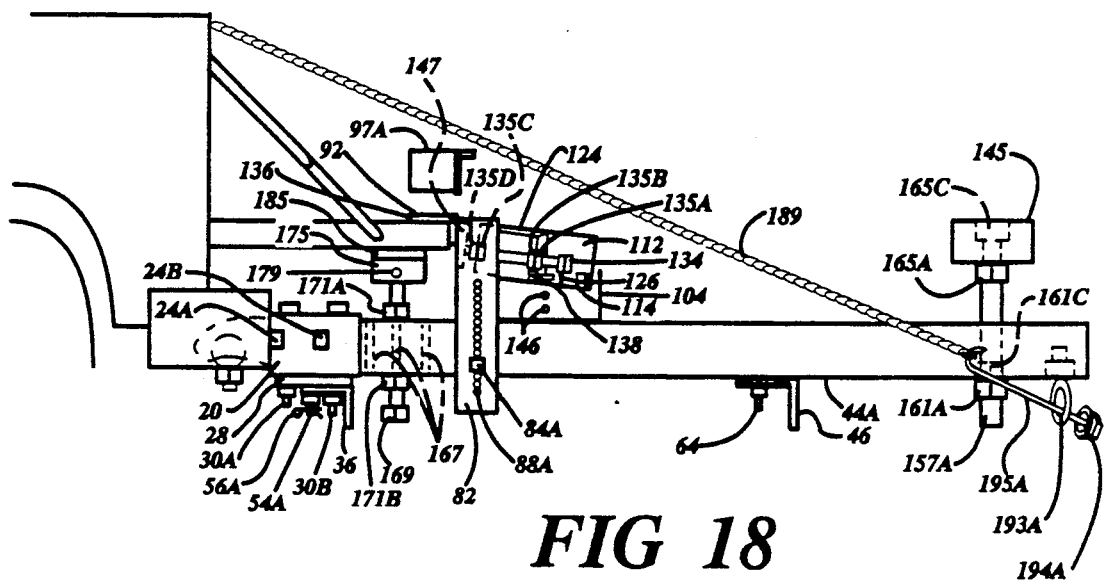
FIG 18
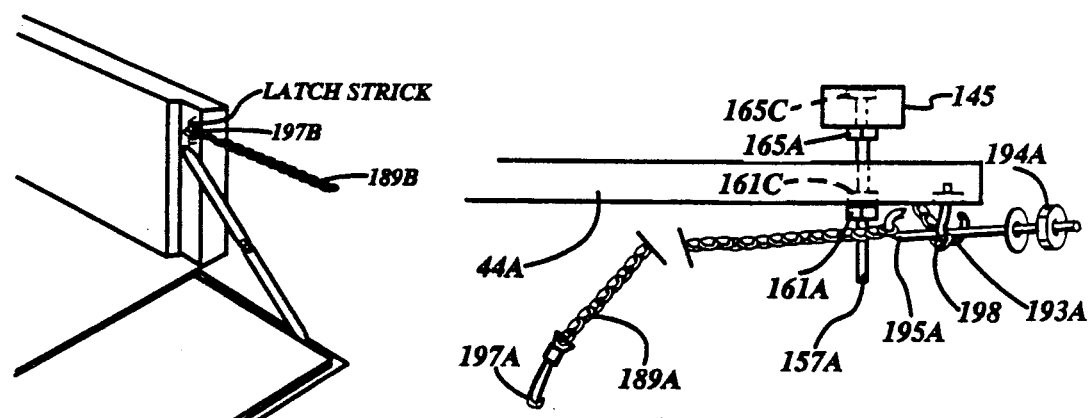
FIG 19
FIG 20

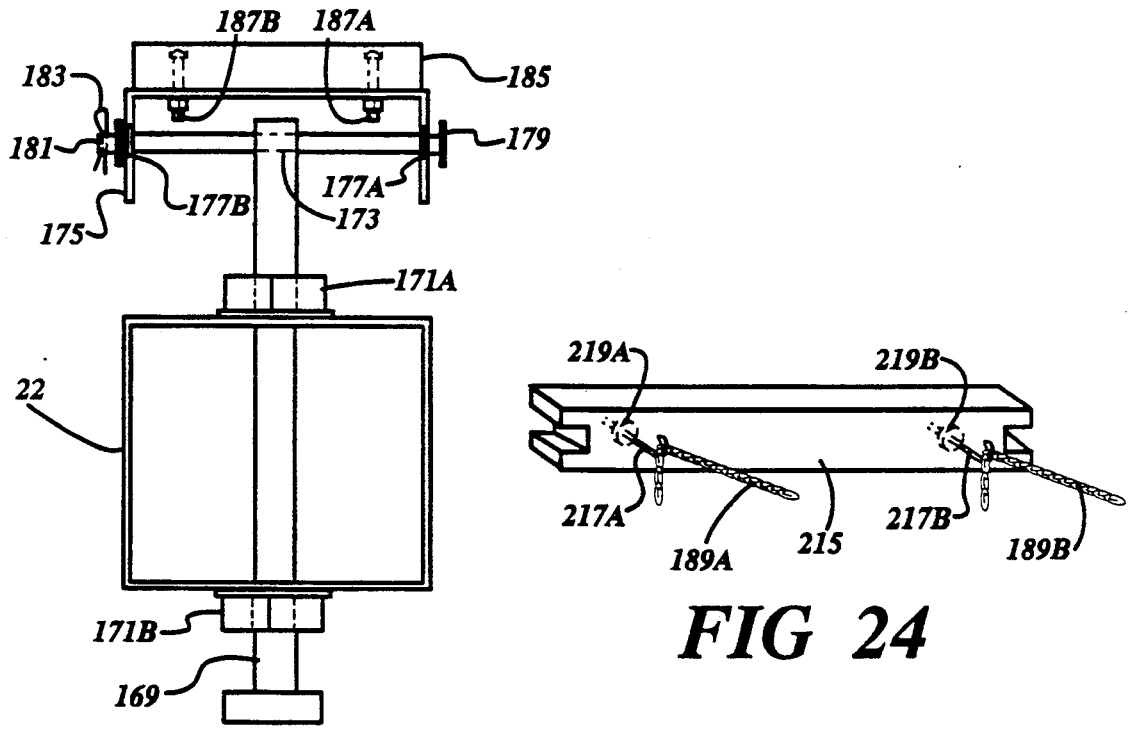
FIG 22
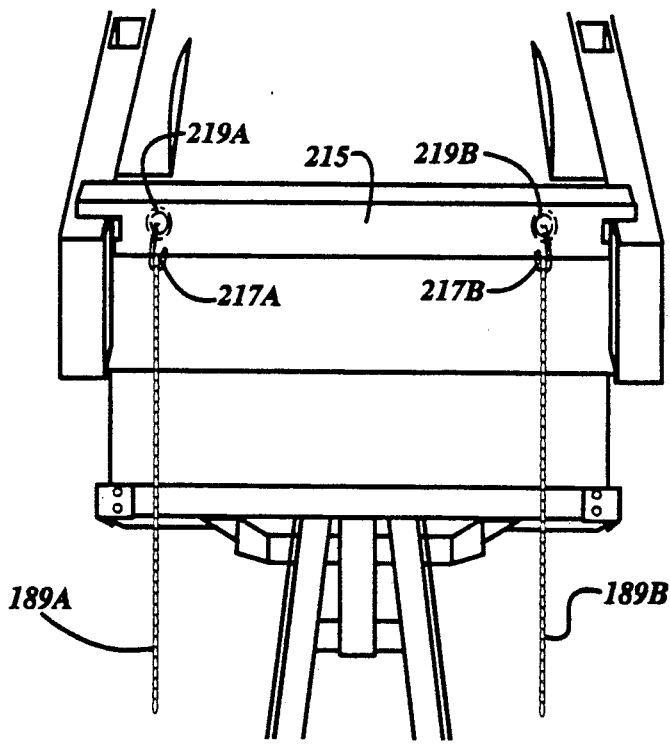
FIG 24
FIG 23

TRUCK CARGO SUPPORT OUTRIGGER

BACKGROUND—FIELD OF INVENTION

This invention relates to the area of after market pickup truck accessories, especially to providing an outboard method and device for supporting long pieces of materials or structures that extend in length far beyond the rear of the pickup truck cargo bed or the bed of one of the older model wagon like vehicles which utilize drop down tailgates such as the older model Ford Broncos or Chevrolet Blazers etc.

BACKGROUND—DESCRIPTION OF PRIOR ART

Most pickup truck owners, especially those who tend to be do-it yourselfers, frequently haul materials or structures that are much longer than the pickup truck bed in which they are doing the hauling. This has created a need to provide added support for these lengthly materials and structures beyond that which the pickup truck bed itself can give. Most professional carpenters, plumbers, heating and air condition installers, gutter installers etc. generally have a steel rack built high above the pickup truck bed and extending over the truck cab. This sort of arrangement serves the professional well. However, the average do-it yourselfer does not want his pickup truck encumbered with this rather unsightly, expensive, steel rack nor does he do enough hauling to warrant this permanent type of rack. As a consequence, another frequently used method has been employed to keep long pieces of materials or structures from tilting and falling out of the rear of the pickup truck bed. This method is weighing down the forward most ends of the long pieces of materials or structures with some sort of heavy unanchored object This creates an unstable and dangerous situation in that the object used as weight can easily roll off the material or structure it is supposed to hold down. A device currently on the market which is used to aid in solving the problem of keeping long pieces of material that extend out over the back end of the pickup truck bed from tilting and falling out of the pickup truck bed is called a "Load Buddy". This device is anchored to the upper edges of the forward most part of the pickup truck bed sides and expands down (adjustable) to the pickup truck bed level thus holding the forward most ends of long materials down against the forward most part of the pickup truck bed. The drawback to this device and method is the fact that the ends of the long pieces of material that extend out beyond the end of the pickup truck bed are left to dangle, bounce up and down and sway back and forth and therefore work loose from the "Load Buddy". Also, beyond a certain length, pieces of fragile or flexible material can not be hauled without some sort of rear support outside the truck bed. Otherwise, they will bend or break under their own weight at the point where the pickup truck's bed or lowered tailgate ends. The "Load Buddy" does not remedy this problem. Also many constructed structures, due to their design, cannot be adequately held down by the "Load Buddy" simply because there is no adequate point on the structure for the "Load Buddy" to press against.

SUMMARY

The present invention (Truck Cargo Support Outrigger) is a device that will reliably, easily and safely provide outboard support for long pieces of material or structures that cannot otherwise, due to their length, be transported at all or transported safely in the bed of a pickup truck or the bed of a wagon like vehicle with a drop down tailgate such as the older model Ford Broncos, Chevrolet Blazers, etc. It is a light weight, portable, easy and quick to attach and remove cargo outboard support device that can be universally attached to all pickup truck or wagon like vehicles with drop down tailgates. The present invention is a pickup truck or wagon outboard load support device which will prevent that part of long materials or structures that is extended out the rear and well beyond the supporting surface of the cargo bed from bouncing or whipping up and down, swinging from side to side, or tilting and failing out of the rear of the vehicles cargo bed. The "Load Buddy" described in the background section does not provide support for that portion of a cargo load which is extended out beyond the rear of a pickup truck bed and therefore cannot solve the problem just described.

The present invention consist of a V shaped frame accompanied with the necessary additional framework to securely attach and suspend it from the rear portion of a pickup truck. This V shaped frame is referred to in the specification as the horizontal load support assembly. The narrow end of the V shaped frame is attached to the rear portion of the pickup truck while the wider portion of the V shaped frame extends a number of feet rearward away from the rear of the pickup truck. A cross member attached crossways at the wide end of the V shaped frame provides a cargo load carrying surface on level with the pickup truck cargo bed, yet outside and to the rear of the pickup truck cargo bed. The present invention is designed so a framing member at the narrow end of the V shaped frame can be coupled directly to a pickup truck's standard type trailer hitch coupler ball located in the usual position below the pickup truck's tailgate. Further, a square like frame attached crossways the V shaped frame extends up vertically from the V shaped frame and attaches to the lowered pickup truck tailgate thus suspending and stabilizing the V shaped frame to the rear portion of the pickup truck. This square like frame is referred to in the specification as the vertical support assembly. The present invention is a outboard load support device that can be attached to any pickup truck without the need for drilling holes in the pickup truck or modifying the pickup truck in any way other than mounting a standard type trailer hitch. The older model wagon type vehicles with the drop down tailgate can also use the present invention without any drilling or modification to the wagon other than mounting a standard type trailer hitch. Since auto manufactures are no longer including drop down tailgates on the newer wagon type vehicles the present invention's application will be primarily to pickup trucks.

DESCRIPTION OF FIGURES

FIG. 10 is a view of the pivotal bolt lock mechanism and its position relative to the upper horizontal rail 92 and the spar 22.

FIG. 11 is a view of the lock bolt housing 124 along with the lock swing 112 in which the lock bolt housing is to be mounted on. These represent some of the parts that help make up the pivotal bolt lock mechanism. Also seen is the lock bolt 134 mounted on the lock bolt housing 124.

FIG. 12 is a view of the lock base 104 and the various bolt holes needed to make it functional.

FIG. 13 is a close up view of how the anchor bolt 138 is utilized to secure the more forward portion of the lock swing 112 to the lock base 104.

FIG. 17 is a close up view of the anti-bounce bumper mechanism as it is assembled to be properly mounted on the partial wood model of the Truck Cargo Support Outrigger.

FIG. 18 shows a side view of the steel model of the Truck Cargo Support Outrigger. Here the vertical support assembly is seen in its vertical position with the upper horizontal rail 92 mounted on the pickup truck tailgate. The pivotal bolt lock mechanism is seen binding the upper horizontal rail 92 to the pickup truck tailgate. Also the anti-bounce bumper mechanism is seen pressed against the lower face of the lowered pickup truck tailgate.

FIG. 19 shows the attachment of the load reliever chain 189B to a pickup truck tailgate latch strike.

FIG. 20 is a close up view of the load reliever chain 189A and its associated linkage. Also seen is a close up view of the mounting technique of the rear support cross brace 145.

FIG. 22 is a close up view of the anti-bounce bumper mechanism which is mounted on spar 22 of the all steel model of the Truck Cargo Support Outrigger. The rubber bumper 185, mounted at the very top of the anti-bounce bumper mechanism, is the contact point with the lower face of the lowered pickup truck tailgate.

FIG. 23 shows a view of the highboard 215 mounted to the rear of a pickup truck cargo bed. It serves as a device for the attachment of the forward ends of the load reliever chains 189A and 189B. The highboard is mounted to the top portion of the sides of the pickup truck cargo bed. The previous FIG. 19 shows a view of a alternative method of attaching the load reliever chains 189A and 189B to the pickup truck tailgate latch stricks.

FIG. 24 shows a close up view of the various parts of the highboard 215.

DRAWING REFERENCE NUMERALS

20—Trailer Hitch Coupler

Figure 1:
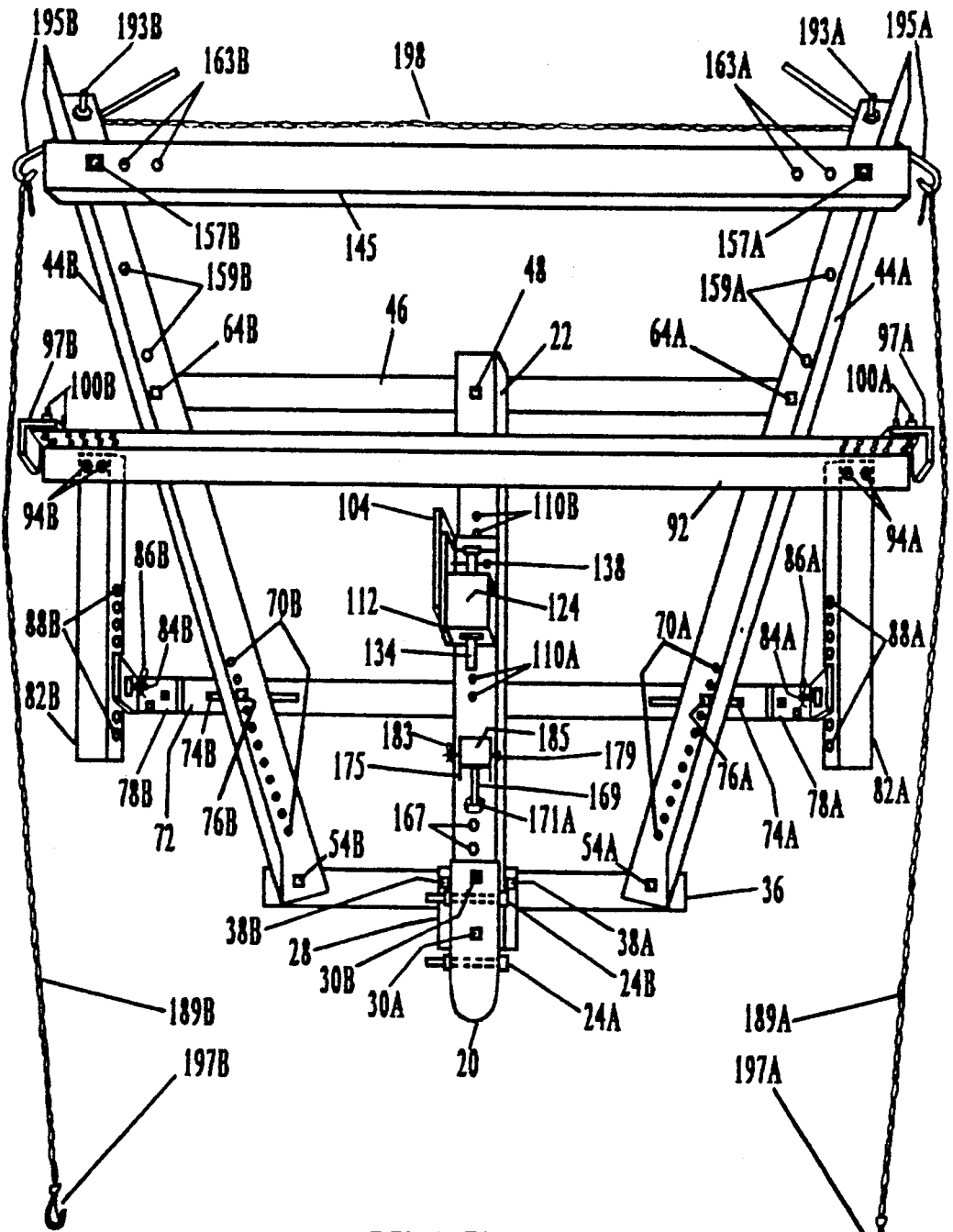
FIG. 1 shows a view of the all metal Truck Cargo Support Outrigger. However the view does show the rear support cross brace 145 as being a wooden two by four (2"×4").

22—2"×2"×⅛"×30" steel spar (this spar is a wooden two by four—2"×4"×37"—on the partial wood Truck Cargo Support Outrigger)

24A, 24B—Two ⅜"×3" bolts (two flat washers, two lock washers, two nuts)

26A, 26B—Two sets of ⅜" bolt holes, two holes per set (not shown)

28—4"×4"×¼" anti twist plate 30A, 30B—Two 5/16"×3½"bolts (two lock washers, two nuts)

32A, 32B—Two 5/16" bolt hole sets (two 5/16" holes per set/not shown)

34A, 34B—Two 5/16" bolt holes (not shown)

35—5/16" bolt hole (not shown) (bored in the center of the horizontal side of the front cross brace 36)

36—2"×2"×⅛"×12" front cross brace 38A, 38B—Two ¼"×¾" bolts (two lock washers, two nuts)

40A, 40B—Two ¼" bolt holes (not shown)

42A, 42B—Two ¼" bolt holes (not shown)

44A, 44B—Two 2"×2"×⅛"×6' (or 8') angle aluminum or angle iron load support rails (these load support rails are wood two by fours—2"×4"×8'—on the partial wood Truck Cargo Support Outrigger)

46—2"×2"×⅛"×24¼" angle aluminum or angle iron middle cross brace (this middle cross brace is a wood two by four (2"×4"×20") on the partial wood model of the Truck Cargo Support Outrigger)

48—5/16"×3" bolt

49—Safety cotter pin

50—1/16" safety cotter pin hole (not shown)

51—One set of two 5/16" bolt holes (not shown)

52—5/16" bolt hole (not shown)

54A, 54B—Two 5/16"×1" bolts 56A, 56B—Two 1/16" safety cotter pins 58A, 58B—Two 1/16" safety cotter pin holes (not shown)

60A, 60B—Two 5/16" bolt holes (not shown)

62A, 62B—Two 5/16" bolt holes (not shown)

64A, 64B—Two ¼"×¾" bolts (two lock washers, two nuts)

66A, 66B—Two ¼" bolt holes (not shown)

68A, 68B—Two ¼" bolt holes (not shown)

70A, 70B—Two sets of ¼" bolt holes, eleven holes per set

72—2"×2"×⅛"×24" base rail 74A, 74B—Two ¼" wide by 4" long slots located in base rail 72

76A, 76B—Two ¼"×¾" bolts (these bolts are ¼"×5" on the partial wooden model of the Truck Cargo Support Outrigger) (one lock washer and one nut per bolt)

78A, 78B—Two 2"×2"×2"×⅛" L pieces 80A, 80B—Two sets of ¼"×¾" bolts, three bolts per set including one lock washer and nut per bolt 81A, 81B—Two sets of ¼" bolt holes, three holes per set (not shown) (bored in L pieces 78A, 78B)

82A, 82B—Two 2"×2"×⅛"×12" vertical arms 83A, 83B—Two sets of ¼" bolt holes, three holes per set (not shown) (bored in base rail 72)

84A, 84B—Two ⅜"×1¼" bolts (two flat washers per bolt, one nut per bolt)

86A, 86B—Two safety cotter pins 87A, 87B—Two ⅜" bolt holes (not shown) (one said hole bored in the center of the vertical side of each of the L pieces 78A, 78B)

88A, 88B—Two sets of ⅜" bolt holes, ten bolt holes per set (one set bored through the inside side of each of the vertical arms 82A,82B)

90A, 90B—Two 1/16" safety cotter pin holes (not shown)

92—2"×2"×⅛"×57" upper horizontal rail 94A, 94B—Two sets of ¼"×½" machine screws, two machine screws per set (four lock washers, four nuts)

95A, 95B—Two sets of ¼" machine screw holes, two holes per set (bored through the vertical side of the upper horizontal rail 92)

96A, 96B—Two sets of ¼" machine screw holes, two holes per set (bored in the vertical arms 82A, 82B.

97A, 97B—Two adjustable 2"×2"×2"×⅛" L shaped anti-sway caps 98A, 98B—Two sets of 1 7/16" long by ¼" wide slots, two slots per set, one slot set per each anti-sway cap 97A,97B 99A, 99B—Two lengthened adjustable 2"×2"×2"×⅛"×12" L shaped anti-sway caps 100A, 100B—Two sets of ¼"×¾" machine screws, two machine screws per set (one lock washer and nut per machine screw)

102A, 102B—Two sets of ¼" machine screw holes, ten holes per set (bored through the horizontal side of the upper horizontal rail 92)

103A, 103B—Two sets of ¼" wide by 8" long slot sets, two slots per set, one set cut in each of the lengthened L shaped anti-sway caps 99A, 99B 104—2"×2"×⅛"×5½" lock base 106A, 106B—Two ¼"×2½" bolts (one lock washer and one nut per bolt)

108A, 108B—Two ¼" bolt holes 110A, 110B—Two sets of ¼" bolt holes, twelve bolt holes per set bored in the hollow metal spar 22 (six holes top side and six holes bottom side in metal spar 22 for a total of twelve holes per set or six holes per set bored in wooden spar 22 on the partial wooden model of the Truck Cargo Support Outrigger)

112—2"×2"×⅛"×6¼" lock swing

114—One ¼"×1" bolt (two flat washers, one nut)

116—Safety cotter pin

118—1/16" cotter pin hole

120—¼" bolt hole

122—¼" bolt hole

124—2"×2"×⅛"×3" hollow, rectangle shaped lock bolt housing

126—¼" stop nut

128—¼" nut mounted on anchor bolt 138

130A, 130B—Two ¼" bolt holes (not shown)

132A, 132B—Two ⅜" threaded bolt holes (not shown)

134—⅜"×6" threaded lock bolt 135A, 135B, 135C, 135D—Four ⅜" nuts (four lock washers)

136—2"×1/16"×57" hard rubber finish protector strip 137A, 137B—Two sets of ¼" holes (not shown), ten holes per set (bored in the finish protector strip 136)

138—¼"×4" anchor bolt

140—Safety pull pin

142—1/16" safety pull pin hole

144—¼" bolt hole

145—Rear support cross brace, 2"×2"×⅛"×57" (steel) or 2"×4"×57" (wooden)

146—Set of three ¼" bolt holes

147—2"×2"×¼" lock bolt receiver plate 149A, 149B—Two 11/16" holes (bored in lock bolt receiver plate 147)

151—Wooden 2"×2¼"×5¼" block (thickness can be tappered)
153A, 153B—Two ¼" bolt holes (not shown)
155A, 155B—Two auxiliary ¼"×4½" bolts
157A, 157B—Two ⅜"×12" threaded rods (these rods are ⅜"×12" on the partial wooden version of the Truck Cargo Support Outrigger)
159A, 159B—Two sets of ⅜" rod holes, three holes per set (bored through the horizontal side of load support rails 44A and 44B / these rod holes are ½" diameter on the partial wooden version of the Truck Cargo Support Outrigger)
161A, 161B, 161C, 161D—Four ⅜" nuts (four lock washers or four flat washers / these nuts are ½" on the partial wood version of the Truck Cargo Support Outrigger)
163A, 163B—Two sets of ⅜" rod holes, three holes per set (bored through the horizontal side of the rear support cross brace 145 / these rod holes are ½" in diameter on the partial wood version of the Truck Cargo Support Outrigger)
165A, 165B, 165C, 165D—Four ⅜" nuts (four lock washers or four flat washers) (these nuts are ½" on the partial wood version of the Truck Cargo Support Outrigger)
167—Set of six ½" threaded bolt holes (three holes bored through the bottom horizontal side of steel spar 22, three holes bored through the top horizontal side of steel spar 22)
169—½"×10" bumper bolt
170—½"×10" bumper rod
171A, 171B—Two ½" nuts (one lock washer per nut)
172—1½"×1½"×⅛"×6½" bumper rod base
173—3/16" pin hole (bored through the tip of bumper bolt 169 which is used on the all metal Truck Cargo Support Outrigger or bored through the tip of bumper rod 170 which is used on the partial wooden Truck Cargo Support Outrigger)
174—Set of four ½" rod holes (bored in bumper rod base 172)
175—2"×2"×1"×1/16" channel iron bumper base
177A, 177B—Two 3/16" pin holes (bored in the vertical sides of bumper base 175.
179—A 2⅜"×3/16" pin
181—1/16" cotter pin hole (bored in tip end of pin 179)
183—Cotter pin
185—2"×2"×½" rubber bumper
187A, 187B—Two ⅛"×¾" machine screws
189A, 189B—Two ten foot 2/0 double twist load reliever chains
191A, 191B—Two ⅜" eye bolt holes (not shown)
193A, 193B—Two ⅜"×2" threaded eye bolts (⅜"×4½" on the partial wooden model of the Truck Cargo Support Outrigger)
194A, 194B—Two ⅜" nuts (installed on eye bolts 195A, 195B / one large flat washer per eye bolts 195A,195B also included)
195A, 195B—Two ⅜"×8" threaded eye bolts
197A, 197B—Two snap hooks
198—2/0 double twist brace chain
199A, 199B—Two ¼"×4½" bolts
201—2"×4"×¼" steel plate
203A, 203B—Two ⅜"×3" bolts
205A, 205B—Two 4½"×3"×¼" wooden shims (not shown)
207—⅜"×4½" bolt (two flat washers and one nut)
209A, 209B—Two 2"×4"×¼" steel plates
210—5/16"×6½" bolt (two flat washer, one nut)
211A, 211B—Two ¼"×5" bolts (1 flat washer and nut per bolt)
212A, 212B—Two ¼"×6½" bolts (two flat washers and one nut per bolt)
213A, 213B—Two ¼"×5" bolts (one flat washer and nut per bolt)
215—Highboard
217A, 217B—Two ⅜"×8" threaded eye bolts
219A, 219B—Two ⅜" nuts (installed on eye bolts 217A, 217B
221A, 221B—Two vertical stakes
223—Lowboard
224A, 224B—Two ¼"×¾" stop bolts
226A, 226B—Two ¼" wide by ¾" long slot sets (two slots per set)

TRUCK CARGO SUPPORT OUTRIGGER—DESCRIPTION

FIG. 1 shows the preferred embodiment of the invention. The Truck Cargo Support Outrigger consist of three primary interconnected sections: A. Horizontal load support assembly. B. Vertical support assembly. C. Pivotal bolt locking mechanism.

Figure 2:
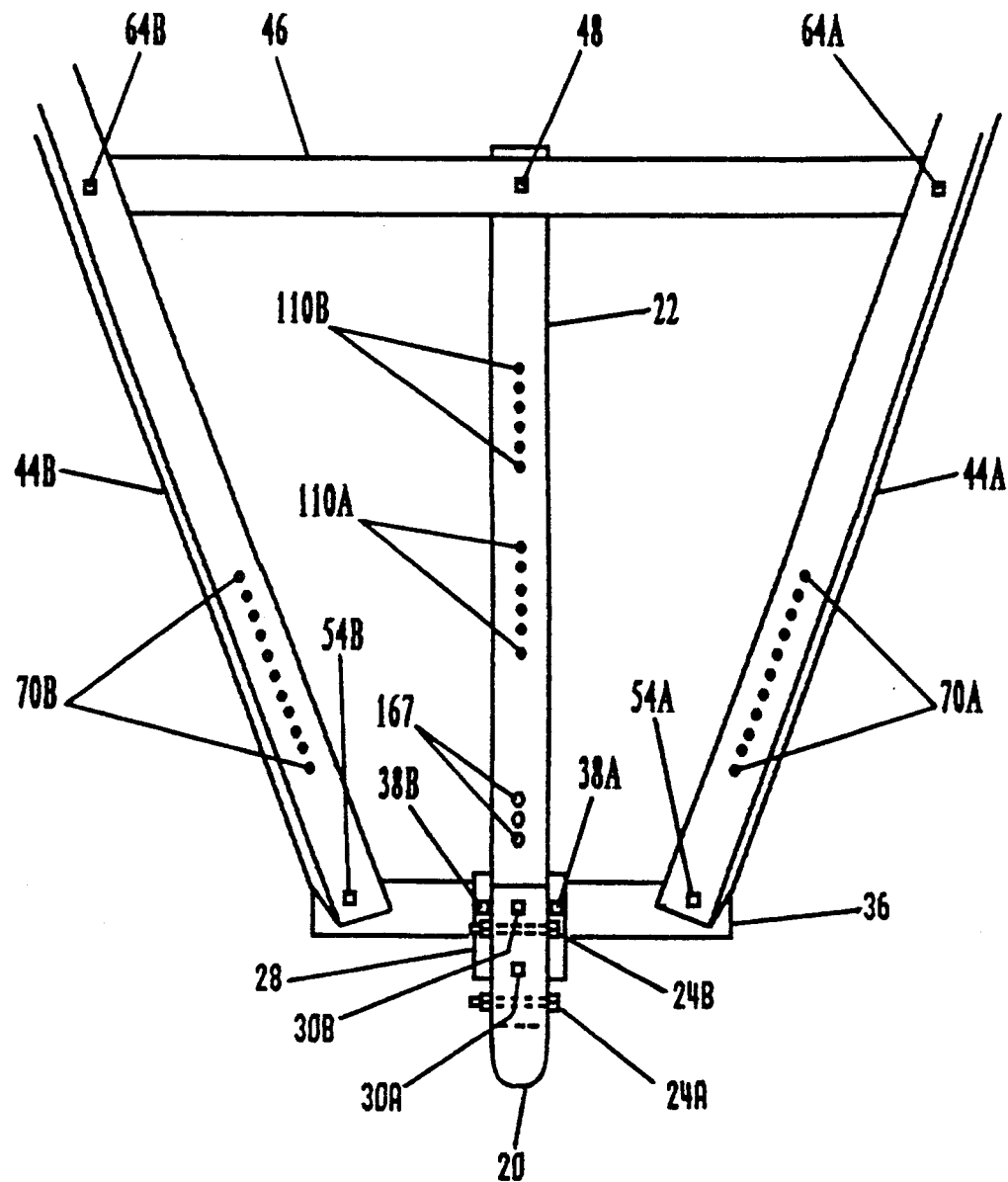
FIG. 2 shows the assembly of a portion of the front of the horizontal load support assembly.

The horizontal load support assembly of the Truck Cargo Support Outrigger is comprised of a standard 1⅞" trailer hitch coupler 20 connected to a spar 22 by two ⅜×3" threaded bolts 24A and 24B including one lock washer and nut per said bolt (See FIG. 2). These bolts 24A and 24B are inserted through the right hand side of the trailer hitch coupler 20 (looking front to rear) and then through ⅜" bolt hole sets 26A and 26B (not shown), two holes per set bored through the right and left hand vertical sides of the spar 22. Bolt hole set 26A is bored 1⅛" on center from the top horizontal edges of the spar 22 and ¾" on center from the forward most end of said spar 22. One hole each in set 26A is bored through each of the two vertical sides of spar 22. Bolt hole set 26B is bored 1⅛" on center from the top horizontal edges of spar 22 and 3" from the forward most end of said spar. One hole each in set 26B is bored through each of the two vertical sides of spar 22. After being inserted through the right hand vertical side of the trailer hitch coupler 20 and then on through bolt hole sets 26A and 26B, the two ⅜×3" bolts 24A and 24B are then inserted through the left hand vertical side of the trailer hitch coupler 20 (looking front to rear) and then the lock washers and nuts are installed on bolts 24A and 24B. The bolt holes 26A and 26B are bored to match and align with holes already bored through the vertical sides of a standard production type trailer hitch coupler. The welding of the trailer hitch coupler 20 to the spar 22 would eliminate the need for the above mentioned bolts 24A and 24B as well as bolt hole sets 26A and 26B.

Spar 22 is preferably made of aluminum or iron, 2"×2" wide, box shaped and hollow. The metal is ¼" thick. This 30" long spar 22 has a 4"×4"×¼" aluminum or iron anti-twist plate 28 attached to its lower horizontal side (See FIG. 2). The forward edge of the anti-twist plate 28 is 1½" rearward from the forward end of spar 22. The attachment is made by two 5/16"×3½" bolts 30A and 30B including one lock washer and one nut per each said bolt. These two bolts 30A and 30B are inserted through the two pre bored and aligned 5/16" bolt holes located in the top side of the standard production trailer hitch coupler 20 and then inserted through the four 5/16" bolt holes that make up bolt hole sets 32A and 32B (two holes per set/not shown). The two bolt holes that make up bolt hole set 32A are bored center line through the top and bottom horizontal sides of spar 22, 1⅜″ on center from the forward end of spar 22 and the two bolt holes that make up bolt hole set 32B are bored center line in the top and bottom horizontal sides of spar 22, 3⅜″on center from the forward most end of spar 22. Bolts 30A and 30B are then inserted through 5/16″ bolt holes 34A and 34B (not shown) bored through the anti-twist plate 28. Bolt holes 34A and 34B are bored center line the anti-twist plate 28 and bolt hole 34A is set in ¾″ on center from the forward edge of the anti-twist plate 28 and bolt hole 34B is set in 1″ on center from the rear edge of the anti-twist plate 28. Bolt 30B is additionally inserted through 5/16″ bolt hole 35 (not shown) bored in the center of the horizontal side of the front cross brace 36 (See FIG. 2). The respective lock washers and nuts are then installed on the bolts 30A and 30B.

A 2″×2″×⅛″×12″ angle aluminum or angle iron front cross brace 36 is attached to the anti-twist plate 28 perpendicularly to spar 22 by two ¼″×¾″ bolts 38A and 38B including one lock washer and nut per each said bolt (See FIG. 2). Bolts 38A and 38B are inserted through ¼″ bolt holes 40A and 40B (not shown) bored through anti-twist plate 28 and set in ½″ on center from the outside edges of the anti-twist plate 28 and set in 1″ on center from the rear edge of the anti-twist plate 28. Bolts 38A and 38B are then inserted through ¼″ bolt holes 42A and 42B (not shown) bored center line the horizontal side of the front cross brace 36 and set in 4⅜″ on center from the outside ends of the front cross brace 36. The respective lock washers and nuts are then installed on bolts 38A and 38B. This front cross brace 36 provides a base for the attachment of the two forward ends of the 2″×2″×⅛″×6′ (or 8′) angle aluminum or angle iron load support rails 44A and 44B (See FIG. 2). As will be explained in the operational section, the two load support rails 44A and 44B have the capability of being pivoted at their attachment points to the front cross brace 36 for the purpose of storage. The welding of the front cross brace 36 directly to the spar 22 would eliminate the need for the anti-twist plate 28 and the related bolts, washers, nuts and bolt holes.

Attached to the rear end of spar 22 and perpendicular to said spar is the 2″×2″×⅛″×24¼″ angle aluminum or angle iron middle cross brace 46 (See FIG. 2). The middle cross brace 46 is attached to spar 22 by a 5/16″×3″ bolt 48 inserted through two 5/16″ bolt holes (not shown) that make up bolt hole set 51 bored center line the top and bottom horizontal sides of spar 22, 2¾″ on center from the rear end of spar 22. The bolt 48 is then inserted through 5/16″ bolt hole 52 (not shown) bored center line both horizontal axes of the middle cross brace 46, horizontal side. Bolt 48 includes a lock washer and nut installed and a safety cotter pin 49 inserted through 1/16″ hole 50 (not shown) bored ⅛″ from threaded tip of bolt 48.

Attached to the outer ends of the front cross brace 36 are the two load support rails 44A and 44B (See FIGS. 1 and 2). The two load support rails 44A and 44B are 2″×2″×⅛″×6′ (or 8′ whichever is preferred) angle aluminum or angle iron. The two forward horizontal ends of these two load support rails 44A and 44B are attached to the two outer ends, on the horizontal side, of the front cross brace 36 by means of two 5/16″×1″ bolts 54A and 54B which include one flat washer, one lock washer and one nut per each said bolt. Each bolt 54A and 54B also includes a 1/16″ safety cotter pin 56A and 56B (one cotter pin per bolt) inserted through 1/16″ cotter pin holes 58A and 58B (not shown) which are bored ⅛″ from the threaded tips of the bolts 54A and 54B. Bolts 54A and 54B, with one flat washer installed per each said bolt, are inserted through 5/16″ bolt holes 60A and 60B (not shown) which are bored through load support rails 44A and 44B, horizontal side, center line, ¾″ on center in from the forward ends of the load support rails 44A and 44B. These two bolts 54A and 54B are then inserted through the two 5/16″ bolt holes 62A and 62B (not shown) bored through the front cross brace 36, center line the horizontal side, and one said bolt hole each is set in 1½″ on center from each of the outer ends of the front cross brace 36. The remaining respective lock washers and nuts for bolts 54A and 54B are installed and then the safety cotter pins 56A and 56B are inserted into 1/16″ holes 58A and 58B on bolts 54A and 54B. As shown in FIGS. 1 and 2 the two load support rails 44A and 44B extend rearward from the front cross brace 36 to form a V shape.

At a point 25¼″ rearward from the forward ends of the load support rails 44A and 44B the two outer horizontal ends of the middle cross brace 46 are attached to the horizontal sides (bottom face) of the two load support rails 44A and 44B by means of two ¼″×¾″ bolts 64A and 64B including one lock washer and nut per each said bolt (See FIGS. 1 and 2). One bolt per each side is utilized. Bolts 64A and 64B are inserted through ¼″ bolt holes 66A and 66B (not shown) bored center line through the horizontal side of load support rails 44A and 44B and 25¼″ on center rearward from the forward ends of the load support rails 44A and 44B. Bolts 64A and 64B are then inserted through ¼″ bolt holes 68A and 68B (not shown) bored center line through the horizontal side of the middle cross brace 46 and set in 1″ from the angled outer ends of the middle cross brace 46. The respective lock washers and nuts are then installed on bolts 64A and 64B. Since this middle cross 46 is attached to the rear of spar 22 as previously described, the spar 22 is able to provide added rearward support to the two load support rails 44A and 44B (See FIG. 1). The load reliever chains 189A and 189B provide additional vertical support (See FIG. 9). This load reliever set up will be explained later.

Beginning 9″ rearward from the forward ends of the load support rails 44A and 44B are a series of eleven ¼″ bolt holes per each said load support rail 44A and 44B. These said bolt holes make up the two bolt hole sets 70A and 70B, eleven holes per set (See FIGS. 1 and 2). The bolt hole set 70A is bored in the load support rail 44A and the bolt hole set 70B is bored in the load support rail 44B. The bolt holes in the bolt hole sets 70A and 70B are spaced ½″ on center apart and bored center line through the horizontal side of each of the load support rails 44A and 44B. These bolt hole sets 70A and 70B are for the purpose of accepting ¼″×¾″ bolts 76A and 76B to secure the vertical support assembly at different locations along the load support rails 44A and 44B. As stated above, the first bolt hole in each of the bolt hole sets 70A and 70B is positioned 9″ on center rearward from the forward ends of the load support rails 44A and 44B. The remainder of the bolt holes in bolt hole sets 70A and 70B are bored rearward from the first holes in bolt hole sets 70A and 70B (See FIGS. 1 and 2).

FIGS. 1, 3, 4, 5, 6, 7 and 8 show a better view of the vertical support assembly. The following is a detailed description of the vertical support assembly. The vertical support assembly is comprised of a 2"×2"×⅛"×24" angle aluminum or angle iron base rail 72. Base rail 72 provides a support surface for the load support rails 44A and 44B to rest on (See FIG. 1). It also provides a support surface for spar 22 to rest on. In order to accomplish the bolting of the vertical support assembly base rail 72 at various positions along the horizontal surface of the two load support rails 44A and 44B, the two load support rails 44A and 44B have, as already stated, two sets of ¼" bolt holes 70A and 70B, eleven holes per set bored in a straight line, spaced ½" on center apart, bored center line in the horizontal side of each of the load support rails 44A and 44B (See FIGS. 1 and 2). Next the base rail 72 has two 4" long by ¼" wide slots 74A and 74B cut through it. These said slots 74A and 74B (See FIG. 3) are cut in a straight line, center line in base rail 72, horizontal side, beginning at a point 3¼" in from each of the two outer horizontal ends of base rail 72. These slots 74A and 74B are necessary since the two load support rails 44A and 44B form a V shape and this results in varying horizontal distances between the two load support rails 44A and 44B. In order to be able to bolt the vertical support assembly at different locations along the load support rails 44A and 44B, the slots 74A and 74B which are cut through the horizontal side of the base rail 72 are needed in order to accommodate the varying horizontal distances between the bolt hole sets 70A and 70B in the horizontal side of the load support rails 44A and 44B. The base rail 72 is secured to the load support rails 44A and 44B by the two ¼"×¾" bolts 76A and 76B with one lock washer and nut installed on each said bolt (See FIGS. 1 and 9).

Figure 3:
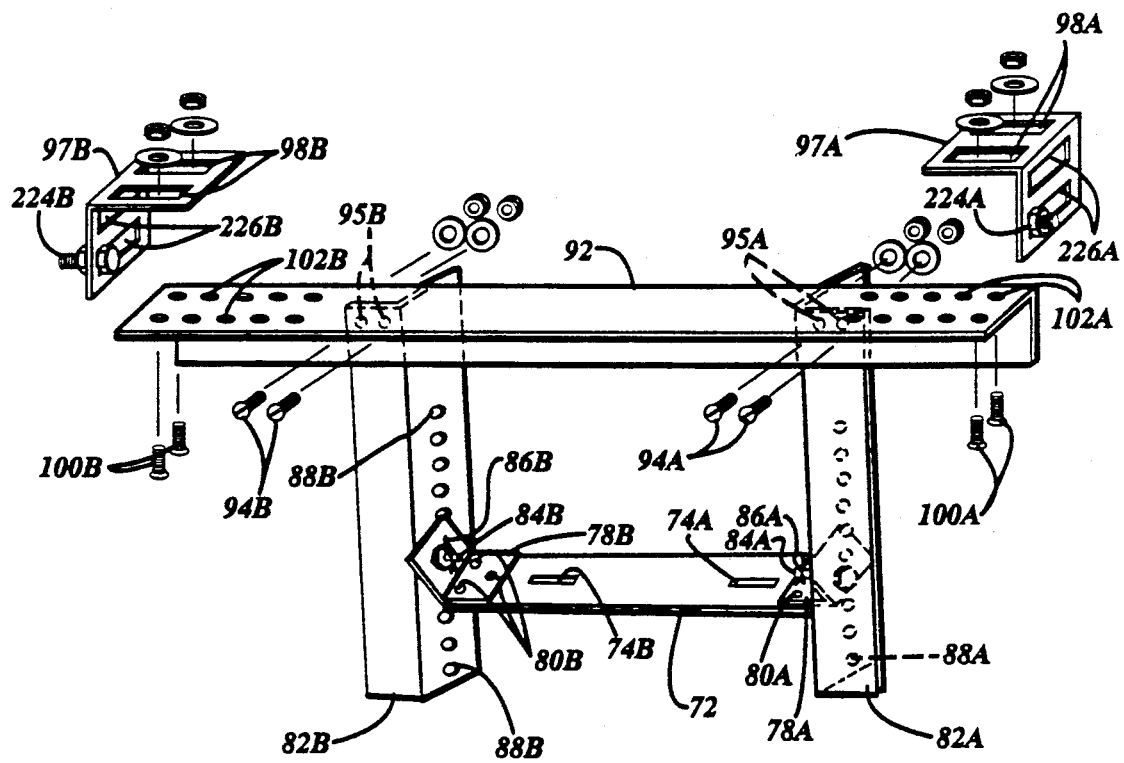
FIG. 3 shows a view of the vertical support assembly portion of the Truck Cargo Support Outrigger.
Figure 7:
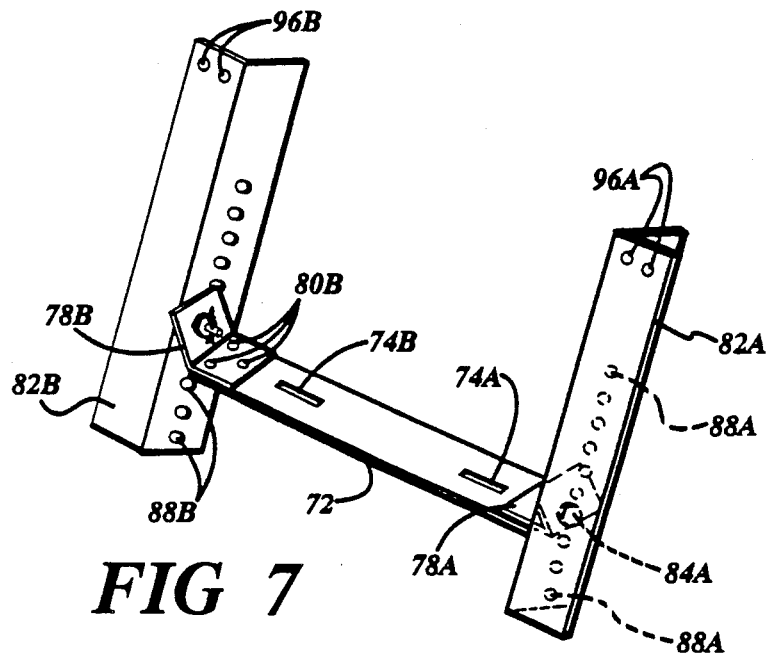
FIG. 7 shows a view of a portion of the vertical support assembly depicting how the base rail 72 is assembled to the vertical arms 82A and 82B.
Figure 8:
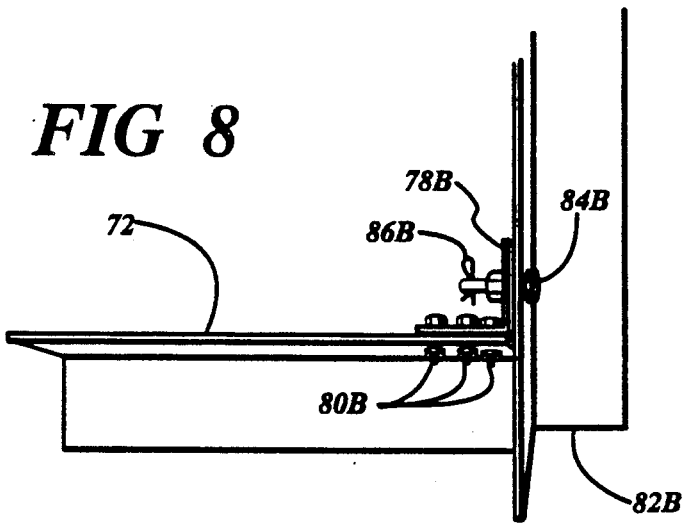
FIG. 8 shows a closer view of the attachment of the base rail 72 to the vertical arm 82B.

Attached to each horizontal end of the base rail 72 are two aluminum or iron 2"×2"×2"×⅛" L pieces 78A and 78B (See FIGS. 3, 7 and 8). Said L pieces 78A and 78B can be welded in place or bolted in place by the six ¼"×¾" bolts that make up bolt sets 80A and 80B. The six ¼"×¾" bolts that make up bolt sets 80A and 80B, three bolts per set, are inserted through the corresponding number of ¼" bolt holes that make up bolt hole sets 81A and 81B (not shown) bored through the horizontal side of the L pieces 78A and 78B. Bolt hole set 81A is located on the L piece 78A and the bolt hole set 81B is located on the L piece 78B. Per each L piece 78A and 78B, two of the said holes in each of sets 81A and 81B are bored through the horizontal side of said L pieces ½" on center back from the vertical face of said L pieces 78A and 78B and ½" on center from the outside edges of the horizontal side of said L pieces 78A and 78B. The third said holes in each set 81A and 81B are bored center line the horizontal side of said L pieces 78A and 78B, set in ½" on center from the end horizontal edge. The six bolts that make up bolt sets 80A and 80B are then inserted through the corresponding ¼" bolt holes that make up the bolt hole sets 83A and 83B (not shown) bored through the horizontal side of the base rail 72. Per each horizontal end of the base rail 72, two of the holes in each of the bolt hole sets 83A and 83B are bored ½" on center in from each of the long horizontal edges of base rail 72 and ⅝" on center in from each of the end horizontal edges of base rail 72. The third of the said holes in bolt hole sets 83A and 83B are bored center line the horizontal side of the base rail 72, set in 1¼" from the end horizontal edges of said base rail 72. The respective lock washers and nuts are then installed on the six bolts that make up bolt sets 80A and 80B (See FIGS. 3, 7 and 8).

Said L pieces 78A and 78B are attached to the two angle aluminum or angle iron 2"×2"×⅛"×12" vertical arms 82A and 82B of the vertical support assembly by two ⅜"×1¼" bolts 84A and 84B consisting of two flat washers per each bolt 84A and 84B (See FIGS. 3, 7 and 8). Bolts 84A and 84B also consist of one nut per each bolt 84A and 84B and one safety cotter pin 86A and 86B per each bolt 84A and 84B. Bolts 84A and 84B, with one flat washer installed per each said bolt, are inserted into each ⅜" bolt hole 87A and 87B (not shown) bored dead center the vertical side of the L pieces 78A and 78B. Bolt hole 87A is located on L piece 78A and bolt hole 87B is located on L piece 78B. Bolt 84A is then inserted into any one of the ⅜" bolt holes that make up the bolt hole set 88A while bolt 84B is inserted into a corresponding ⅜" bolt hole in bolt hole set 88B (See FIGS. 3, 7 and 8). There are ten said bolt holes per set 88A and 88B and one said set per each vertical arm 82A and 82B. The bolt holes that make up the bolt hole sets 88A and 88B are bored center line, in a straight vertical line, through the inside sides of the vertical arms 82A and 82B (see FIGS. 3 and 7). Bolt hole set 88A is located on the vertical arm 82A and bolt hole set 88B is located on the vertical arm 82B. The first holes in bolt hole sets 88A and 88B are bored 2⅜" on center from the bottom ends of the vertical arms 82A and 82B with the remainder of the holes being spaced upward ⅜" on center apart. There are ten said holes bored through each vertical arm 82A and 82B. Upon the insertion of bolts 84A and 84B into bolt holes 87A and 87B and into the bolt holes that make up the bolt hole sets 88A and 88B as described above the remaining flat washers are installed on each bolt 84A and 84B along with the respective nuts. The safety cotter pins 86A and 86B are then inserted in 1/16" holes 90A and 90B (not shown) bored ¼" from the threaded tip ends of bolts 84A and 84B (See FIG. 8). This said attachment point of the L pieces 78A and 78B to the vertical arms 82A and 82B by the two bolts 84A and 84B forms a rotatable joint (See FIG. 7).

Figure 6:
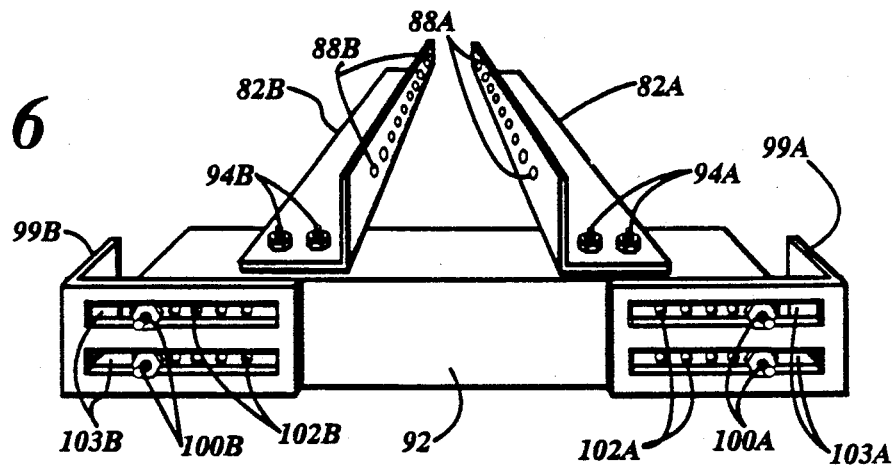
FIG. 6 shows a view of the upper horizontal rail 92 with the lengthened L shaped anti-sway caps 99A and 99B mounted to both ends, upper face, horizontal side.

The upper ends of the vertical arms 82A and 82B are attached to the rearward face of the vertical side of the upper horizontal rail 92 of the vertical support assembly by either welding or by the four ¼"×½" machine screws that make machine screw sets 94A and 94B (See FIGS. 1, 3, and 6). There are two machine screws per sets 94A and 94B. Machine screw sets 94A and 94B are inserted (countersunk) through the four ¼" machine screw holes that make up machine screw hole sets 95A and 95B (two said holes per set) bored through the vertical side of the upper horizontal rail 92 (See FIGS. 3 and 4). The two machine screw hole positions for each machine screw hole set 95A and 95B are 15" and 16" on center from each outward end of the upper horizontal rail 92 (one set per each outward end) and each machine screw hole in sets 95A and 95B is 1" on center up from the bottom horizontal edge of the upper horizontal rail 92. FIG. 3 shows the machine screw hole sets 95A and 95B as being higher than 1" above the bottom horizontal edge of the upper horizontal rail 92. Machine screw sets 94A and 94B are then inserted through the four ¼" machine screw holes that make up machine screw hole sets 96A and 96B, two holes per set, one set per each vertical arm 82A and 82B. These machine screw hole sets 96A and 96B are bored through the sides of the vertical arms 82A and 82B that are placed against the vertical side of the upper horizontal rail 92 (See FIG. 7). The machine screw holes that make up machine screw hole sets 96A and 96B are bored ⅞" on center down from the upper ends of the vertical arms 82A and 82B. These said machine screw holes in machine screw hole sets 96A and 96B are spaced 1" on center apart, set approximately ½" on center in from said vertical arm's vertical edges. One lock washer and nut is installed per each said machine screw in machine screw set 94A and 94B (See FIGS. 1, 3 and 6).

The upper horizontal rail 92 of the vertical support assembly lies perpendicular to the vertical arms 82A and 82B of said assembly (See FIG. 3). The upper horizontal rail 92 is 2"×2"×⅛"×57", made of either angle aluminum or angle iron. Anchored to the bottom face of the horizontal side of the upper horizontal rail 92 is a 2"×1/16"×57" hard rubber finish protector strip 136 (See FIG. 18). This hard rubber finish protector strip 136 is held in place by glue. Small countersunk machine screws could be used to hold the said finish protector strip 136 in place, however, gluing is the easier and least expensive method. Bored in the hard rubber finish protector strip 136 are a group of twenty ½" holes that make up the hole sets 137A and 137B (ten holes per set). The ½" hole sets 137A and 137B are bored to align with the ¼" machine screw hole sets 102A and 102B which are bored through the horizontal side of the upper horizontal rail 92 (See FIG. 3). Hole sets 137A and 137B allow for the insertion and removal of the machine screw sets 100A and 100B from the machine screw hole sets 102A and 102B which are bored in the upper horizontal rail 92. Machine screw sets 100A and 100B are used in conjunction with the L shaped anti-sway caps 97A and 97B (See FIG. 3).

Figure 4:
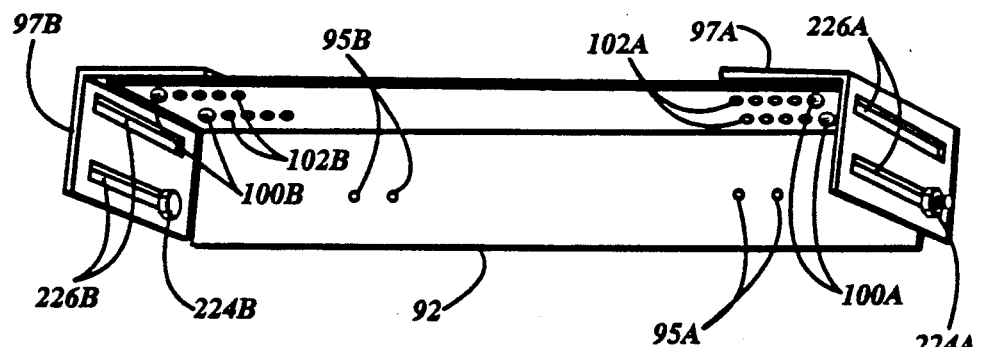
FIG. 4 shows a view of the upper horizontal rail 92 with the L shaped anti-sway caps 97A and 97B mounted on both its ends, upper face, horizontal side.
Figure 5:
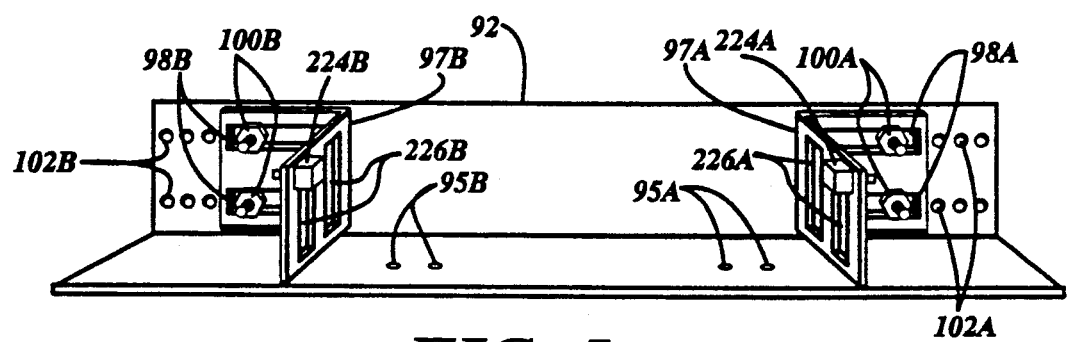
FIG. 5 shows a view of the upper horizontal rail 92 with the L shaped anti-sway caps 97A and 97B mounted to its lower face, horizontal side.
Figure 9:
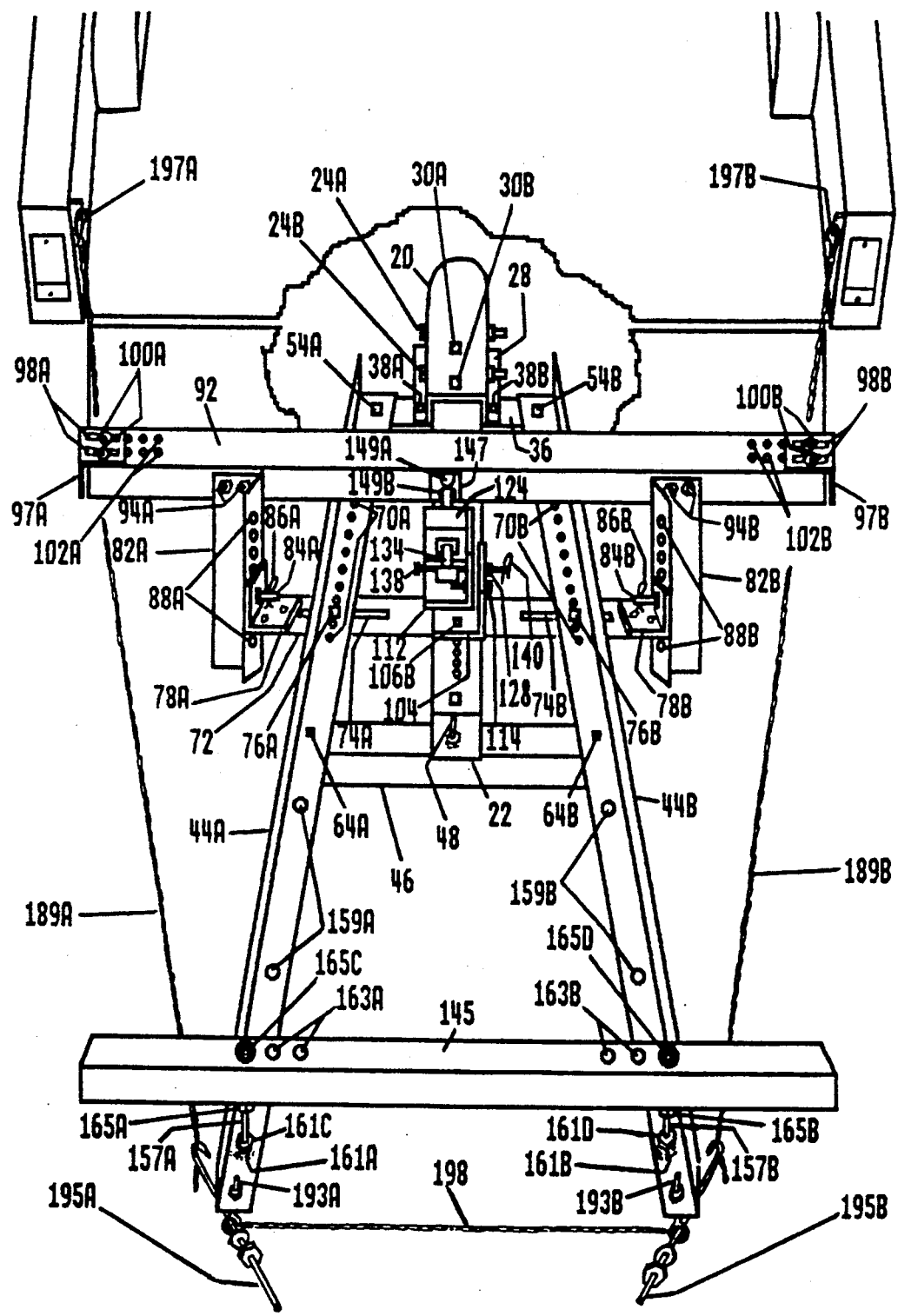
FIG. 9 is a rear view of the Truck Cargo Support Outrigger mounted to a pickup truck. The load reliever chains 189A and 189B are shown providing additional support.

Attached to each end of the top face of the horizontal side of the upper horizontal rail 92 are two horizontally adjustable L shaped 2"×2"×2"×⅛" anti-sway caps 97A and 97B (See FIGS. 3, 4 and 9). Cut through one side of each of these two L shaped anti-sway caps 97A and 97B are two parallel 1 7/16" long by ¼" wide slots. These said slots make up slot sets 98A and 98B. There are two slots per set and one said set per each L shaped anti-sway cap 97A and 97B. Slots sets 98A and 98B are cut in proper position to align with any parallel two of the ¼" machine screw holes that make up machine screw hole sets 102A and 102B bored in the vicinity of the left and right ends of the horizontal side of the upper horizontal rail 92 (See FIGS. 3, 4, 5 and 9). There are ten ¼" machine screw holes per each set 102A and 102B. The machine screw hole sets 102A and 102B are, as stated above, bored through the horizontal side of the upper horizontal rail 92. The ¼" machine screw hole set 102A is bored in the vicinity of the right hand end of the upper horizontal rail 92 (front of outrigger looking to rear). The ¼" machine screw hole set 102B is bored in the vicinity of the left hand end of the upper horizontal rail 92 (front of the outrigger looking to rear). These said holes, in each said set 102A and 102B are positioned parallel to each other spaced 1" apart on center. The first two parallel holes in either set 102A and 102B are bored ½" on center in from the outer ends of the horizontal side of the upper horizontal rail 92. Per these said outer most holes the two L shaped anti-sway caps 97A and 97B can be mounted on both ends of the top face of the horizontal side of the upper horizontal rail 92 (See FIGS. 3 and 4). The ¼"×¾" machine screw sets 100A and 100B (two machine screws per set) are inserted from the bottom face of the horizontal side of the upper horizontal rail 92 through the two outer most parallel holes (tapered for countersinking) in machine screw hole sets 102A and 102B (See FIG. 3). These machine screw sets 100A and 100B are countersunk in the bottom face of the horizontal side of the upper horizontal rail 92 when inserted through the two outer most parallel holes in machine screw hole sets 102A and 102B. The said machine screw sets 100A and 100B are then inserted through the 1 7/16" long by ¼" wide slot sets 98A and 98B cut through the two L shaped anti-sway caps 97A and 97B (two slots per said set, one said set per each L shaped anti-sway cap 97A, 97B). A lock washer and nut is then installed on each of the four machine screws that make up machine screw sets 100A and 100B. So mounted, one side of each of the L shaped anti-sway caps 97A and 97B is positioned downward over the end edges of the horizontal side of the upper horizontal rail 92 while the other side of the said L shaped anti-sway caps 97A and 97B is laying flat on the upper face of the horizontal side of the upper horizontal rail 92 (See FIGS. 4 and 9). Per slot sets 98A and 98B the L shaped anti-sway caps 97A and 97B are pushed up tight against the outer edges of the pickup truck or wagon tailgate. Machine screw sets 100A and 100B are then tightened per the lock washers and nuts.

At times the upper horizontal rail 92 will be mounted on a truck tailgate that is shorter in width than the length of the upper horizontal rail 92. As a result of this, the remainder of the machine screw holes that make up the machine screw hole sets 102A and 102B are bored parallel to each other at locations along the horizontal side of the upper horizontal rail 92 to approximately match the various widths of the numerous pickup truck or wagon tailgates sold on the market. Per these remaining machine screw holes in sets 102A and 102B the two L shape anti-sway caps 97A and 97B are mounted to the bottom face of the horizontal side of the upper horizontal rail 92 (See FIGS. 5 and 21). So mounted, one side of each of the L shaped anti-sway caps 97A and 97B is pointed downward vertically while the other side is mounted flat against the bottom face of the horizontal side of the upper horizontal rail 92 and pointed outward toward the outer ends of the upper horizontal rail 92. The machine screws in the machine screw sets 100A and 100B are, in this case, inserted through the horizontal side of the upper horizontal rail 92 from its top face through to the slot sets 98A and 98B in the L shaped anti-sway caps 97A and 97B. Machine screw sets 100A and 100B continue on through the slot sets 98A and 98B located in the L shaped anti-sway caps 97A and 97B. Lock washers and nuts are installed on the machine screw sets 100A and 100B. Per the above mentioned slot sets 98A and 98B in the horizontal positioned sides of the said L shaped anti-sway caps 97A and 97B, the vertically positioned sides of the said L shaped anti-sway caps 97A and 97B can be pushed up snug against the outer edges of the pickup truck or wagon tailgate. The lock washers and nuts on machine screw sets 100A and 100B are then run up tight.

The parallel holes in the hole sets 102A and 102B are not in a position to be directly in line with the outside edges of the various size pickup truck tailgates available but positioned slightly outward from the said edges in order that the tailgates will not interfere with placing the lock washers and nuts on the machine screw sets 100A and 100B. Actually, hex head bolts can be used when the L shaped anti-sway caps 97A and 97B are positioned against the bottom face of the horizontal side of the upper horizontal rail 92 because there is no need for countersinking.

The Truck Cargo Support Outrigger that has an upper horizontal rail 92 which is shorter than the width of a particular tailgate on which it is mounted is provided with an anti-sway capability by means of 2"×2"×2"×¼"×12" L shaped anti-sway caps 99A and 99B. These L shaped anti-sway caps 99A and 99B have lengthened horizontal sections as well as lengthened ¼" wide by 8" long slot sets 103A and 103B (See FIG. 6). The slot sets 103A and 103B are cut through the 12" lengthened portion of the L shaped anti-sway caps 99A and 99B and spaced parallel to each other the same distance as are the slot sets 98A and 98B in the smaller L shaped anti-sway caps 97A and 97B. The lengthened horizontal section of the L shaped anti-sway caps 99A and 99B is that portion of the said L shaped anti-sway caps that lays flat against the upper face of the horizontal side of the upper horizontal rail 92 (See FIG. 6). The lengthened L shaped anti-sway caps 99A and 99B are mounted to the upper horizontal face of the horizontal side of the upper horizontal rail 92 and adjusted up snug against the end edges of the vehicle's tailgate the same way the shorter L shaped anti-sway caps 97A and 97B are mounted and adjusted (See FIG. 6).

Figure 28:
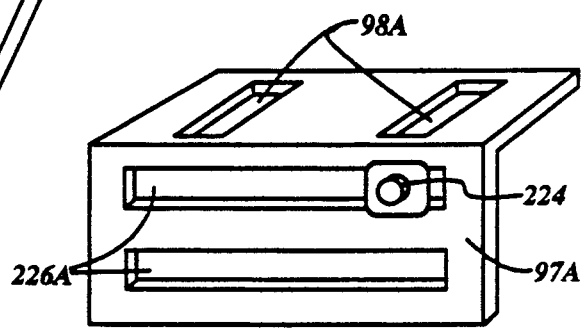
FIG. 28 shows a close up view of the L shaped anti-sway cap 97A. This view shows the stop bolt 224A mounted on the L shaped anti-sway cap 97A per the slot set 226A.
Figure 29:
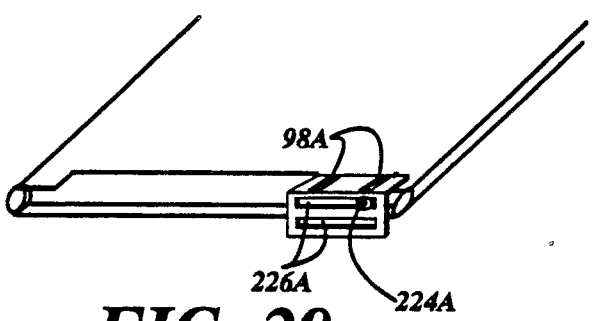
FIG. 29 shows the L shaped anti-sway cap 97A mounted on the upper horizontal rail 92. The stop bolt 224A is also mounted on the L shaped anti-sway cap 97A. The head of the said stop bolt 224A will hang that part of the overhanging lip of the tailgate that curls around and encloses the top end of the outer end of the tailgate edge. This prevents any slight rearward bowing of the outer ends of the upper horizontal rail 92.
Figure 30:
FIG. 30 shows a view of the stop bolt 224A mounted to the L shaped anti-sway cap 97A. Here the head of the stop bolt 224A is in view.

With the L shaped anti-sway caps 97A and 97B mounted to the upper horizontal rail 92, one side of each of the said L shaped anti-sway caps 97A and 97B points downward while the other side of the said L shaped anti-sway caps 97A and 97B lays flat against the horizontal side of the upper horizontal rail 92. The side of the L shaped anti-sway caps 97A and 97B that points downward away from the upper horizontal rail 92 also has a set of slots per each L shaped anti-sway cap 97A and 97B (See FIGS. 28, 29 and 30). These slots are ¼" wide by ¾" long. There are two slots per each set. These two said slot sets are referred to as slot sets 226A and 226B. The purpose of these particular slot sets 226A and 226B is to provide mounting points for mounting each of the two ¼" by ¾" stop bolts 224A and 224B to each of the L shaped anti-sway caps 97A and 97B (See FIGS. 28, 29 and 30). There is one of each said stop bolt 224A and 224B mounted on each L shaped anti-sway cap 97A and 97B. As stated above these said stop bolts 224A and 224B are installed in the slot sets 226A and 226B on the downward pointing side of the L shaped anti-sway caps 97A and 97B. The heads of the said stop bolts 224A and 224B are placed inward toward the outside edges of the vehicle tailgate (See FIGS. 28, 29 and 30). The two slots per each slot set 226A and 226B are needed to provide an ability to vary the exact mounting position of the two stop bolts 224A and 224B. As will be explained in the operation section, the two stop bolts 224A and 224B prevent a slight rearward bowing of the outer ends of the upper horizontal rail 92 which can occur under some circumstances. The lengthened L shaped anti-sway caps 99A and 99B also have the slot sets 226A and 226B with the two stop bolts 224A and 224B mounted through them.

Figure 31:
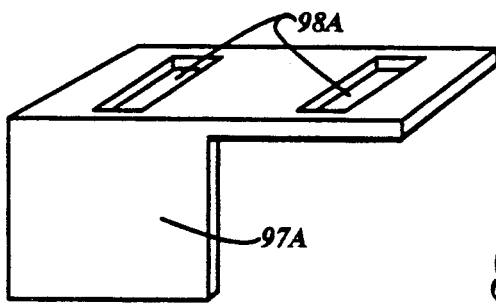
FIG. 31 shows a portion of the downward pointing side of a anti-sway cap cut away. The new standard size Chevrolet and GMC pickup trucks require that a portion of the downward pointing side of the anti-sway caps 97A and 97B be cut away as shown in order to clear a tailgate obstruction. The two stop bolts 224A and 224B in this case are not needed.

The new standard size Chevrolet and GMC pickup trucks require the L shaped anti-sway caps 97A and 97B to be trimmed as shown in FIG. 31. FIG. 31 depicts part of one side of the L shaped anti-sway caps 97A and 97B as having been cut away. This is the side of the said anti-sway caps 97A and 97B that points down when the L shaped anti-sway caps 97A and 97B are mounted to the upper horizontal rail 92. There is a ¾" wide strip cut off the downward pointing side of both the L shaped anti-sway caps 97A and 97B as depicted in FIG. 31. It is necessary to cut a portion of the downward pointing side of the L shaped anti-sway caps 97A and 97B away in order that this side will clear a tailgate obstruction and fit up snug against the outward ends of the tailgate on the new standard size Chevrolet and GMC pickup trucks As will be explained in the operation section this trimmed version of the L shaped anti-sway caps 97A and 97B does not require the two stop bolts 224A and 224B or the two slot sets 226A and 226B which the two stop bolts 224A and 224B are mounted in.

FIGS. 10, 11, 12, 13, 14 and 15 show a better description of the pivotal bolt lock mechanism. A detailed description of the pivotal bolt lock mechanism follows The pivotal bolt lock mechanism is comprised of a 2"×2"×¼"×5½" angle aluminum or angle iron lock base 104 which can be mounted at various locations along the middle, upper (skyward) surface portion of the spar 22 per the ¼"×2½" bolts 106A and 106B (See FIG. 10). Each bolt 106A and 106B has a lock washer and nut per said bolt. Bolts 106A and 106B are inserted through ¼" bolt holes 108A and 108B bored center line the horizontal side of the lock base 104, (See FIGS. 12 and 14) set ½" in on center from the front and rear ends of the lock base 104 and spaced 4½" apart on center. Bolts 106A and 106B are then inserted through four of the ¼" bolt holes that make up bolt hole sets 110A and 110B (See FIGS. 2, 10, and 9). There are twelve said bolt holes per each set 110A and 110B bored center line through the top and bottom sides of spar 22 (six holes bottom side, six holes top side thus giving each said set twelve bolt holes each)(See FIG. 10). The first top and bottom bolt holes in set 110A are bored 15" on center, rearward from the forward end of spar 22. The remainder of the bolt holes in set 110A are bored rearward from the first said bolt holes in set 110A and are spaced 1" apart on center. The first top and bottom bolt holes in set 110B are bored 19½" on center rearward from the forward end of spar 22. The remainder of the bolt holes in set 110B are bored rearward from the first said bolt holes in set 110B and spaced 1" apart on center. The two sets of bolt holes 110A and 110B (top and bottom sides) are in a straight line with each other and the two sets of bolt holes 110A and 110B (top and bottom side) are spaced 2½" apart on center. The respective lock washers and nuts are then installed on bolts 106A and 106B. The bolt hole sets 110A and 110B provide the pivotal bolt lock mechanism with the versatility of being mounted at different locations along the top side of spar 22 relative to where the vertical support assembly has been mounted on the load support rails 44A and 44B (See FIGS. 10 and 1).

The lock swing 112 is a 2"×2"×¼"×6¼" piece of angle aluminum or angle iron which is mounted with its vertical side against the vertical side of the lock base 104 (horizontal side down) by means of a ¼"×1" bolt 114 (See FIGS. 14, 15, 11 and 10). Bolt 114 includes two flat washers, one lock washer and respective nut, plus said bolt 114 has a safety cotter pin 116 inserted in a 1/16" cotter pin hole 118 bored ¼" down from the threaded tip of bolt 114. Bolt 114 with one flat washer installed is inserted through ¼" bolt holes 120 and 122. The remaining flat washer and lock washer is installed on bolt 114, the nut is installed, and the safety cotter pin 116 is installed in hole 118. Bolt hole 120 is bored through the vertical side of lock base 104, 1 3/16" on center from said base's rear vertical edge and 9/16" on center down from said bases upper horizontal edge (See FIG. 12). Bolt hole 122 is bored through the vertical side of lock swing 112, 9/16" on center from the rear vertical edge of said lock swing 112 and 1⅜" on center down from the upper horizontal edge of said lock swing 112 (See FIG. 11).

Figure 14:
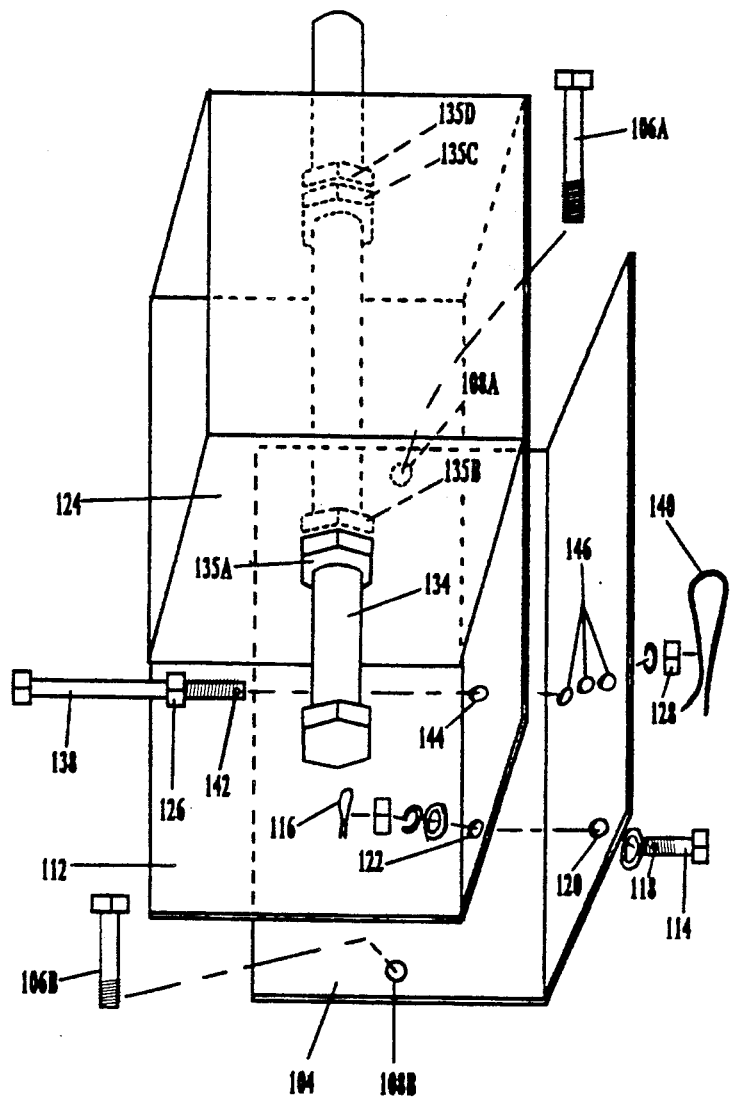
FIG. 14 is a close up view of the pivotal bolt lock mechanism as a complete unit.
Figure 15:
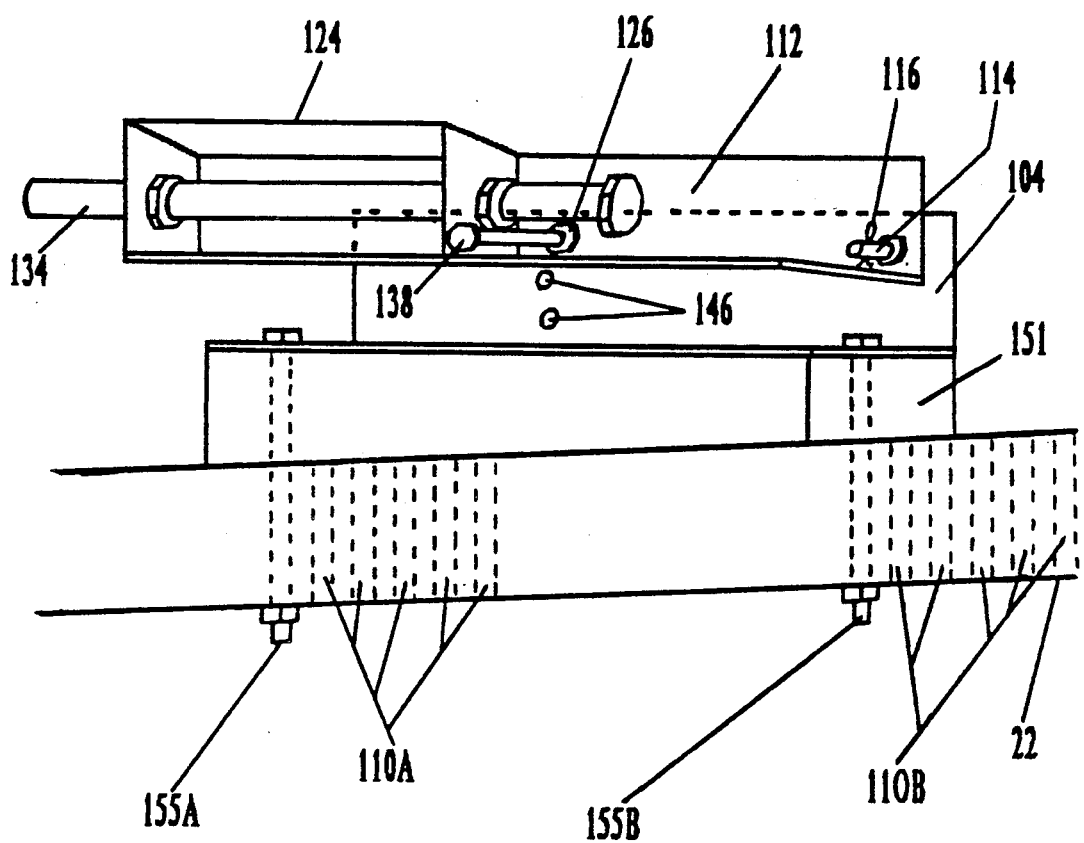
FIG. 15 is a view of the pivotal bolt lock mechanism mounted to spar 22. Wood block 151 is shown here placed between spar 22 and the pivotal bolt lock mechanism in order to give the pivotal bolt lock mechanism added height.

Mounted on the forward end, upper horizontal face, of the lock swing 112 is the lock bolt housing 124 (See FIGS. 14, 15 and 10). The lock bolt housing 124 is 2"×2"×⅛"×3" in size, rectangle shaped and made of either aluminum or iron. The lock bolt housing 124 is welded in place. The front end of the lock bolt housing 124 is flush with the front horizontal edge of the lock swing 112 (See FIG. 15). Two ¼" bolts could be used to bolt the lock bolt housing 124 to the lock swing 112, however, welding is the preferred method. Bored dead center the front end wall of the lock bolt housing 124 is a ⅜" threaded bolt hole 132A (not shown). Bored dead center the rear end wall of the lock bolt housing 124 is a ⅜" threaded bolt hole 132B (not shown). Screwed into the bolt holes 132A and 132B is one ⅜"×6" threaded lock bolt 134 (See FIGS. 14, 15, 10 and 11). Installed on lock bolt 134 are four ⅜" nuts 135A, 135B, 135C and 135D. Nut 135A is located on the back side of the rear end wall of lock bolt housing 124. Nut 135B is located on the front side of the rear end wall of lock bolt housing 124. Nut 135C is located on the back side of the front end wall of the lock bolt housing 124. Nut 135D is located on the front side of the front end wall of lock bolt housing 124 (See FIGS. 11 and 14). Each said nut has a lock washer.

The anchor bolt 138, used in conjunction with the lock swing 112, is ¼"×4" and is threaded for a length of approximately 1" down from its tip end (See FIGS. 14, 13 and 10). A ¼" nut is screwed down tight to the last thread on anchor bolt 138 (Stop nut 126). The anchor bolt 138 is then inserted into the ¼" bolt hole 144 bored through the vertical side of the lock swing 112 (See FIG. 14). Bolt hole 144 is bored 1½" on center down from the top edge of the vertical side of lock swing 112 and 3 11/16" on center rearward from the front end of the vertical side of the lock swing 112. Anchor bolt 138 is then inserted through one of three ¼" bolt holes that make up bolt hole set 146 (See FIGS. 14 and 12). Bolt hole set 146 is bored in a slight arc up the vertical side of the lock base 104 approximately 2¼" from the front end of lock base 104 and spaced apart ⅜" on center. A lock washer and another ¼" nut 128 is installed on anchor bolt 138. Anchor bolt 138 also includes safety pull pin 140 which is inserted into a 1/16" safety pull pin hole 142 bored ¼" down from the threaded tip of said anchor bolt 138 (See FIGS. 13 and 14)). As the front end of lock swing 112 is raised or lowered, the anchor bolt 138, while inserted through bolt hole 144, can be aligned with any one of the three bolt holes in bolt hole set 146 bored in lock base 104, as described above (See FIGS. 11, 12, 13 and 14). This allows the lock swing 112 to be anchored in any one of three separate angles.

A 2"×2"×¼" metal lock bolt receiver plate 147 is welded to the rearward vertical face of the upper horizontal rail 92 in such a position as to be aligned with the forward tip end of the lock bolt 134 (See FIGS. 10 and 9). When the lock bolt 134 is screwed up tight against the upper horizontal rail 92 its tip end will be in either one of two 11/16" holes 149A and 149B bored through the lock bolt receiver plate 147. The two 11/16" holes 149A and 149B are bored one above the other spaced ⅞" on center (See FIGS. 10 and 9).

Figure 32:
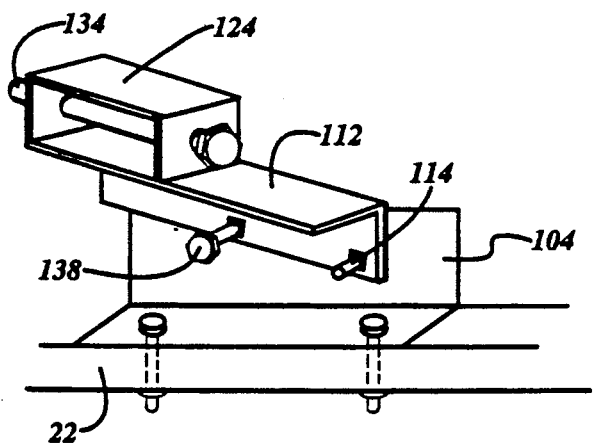
FIG. 32 shows the pivotal bolt lock mechanism with the lock swing 112 flipped over with its vertical side pointed downward instead of up as it is in FIG. 10.

When necessary a wooden 2"×2½"×5½" block 151 can be placed between the lock base 104 and spar 22, thus, giving the pivotal bolt lock mechanism added height if need be (See FIG. 15). The two ¼" bolt holes 153A and 153B (not shown) in the wooden block 151 match the bolt holes 108A and 108B in the lock base 104. When the wooden block 151 is used, both it and the lock base 104 are secured in place by auxiliary ¼"×4½" bolts 155A and 155B. The thickness of the wooden block 151 can be varied. The wooden block 151 can also be tapered in thickness toward its rear end in order to give the pivotal bolt lock mechanism a more perpendicular position relative to the upper horizontal rail 92 (See FIG. 15). With some added and properly positioned bolt holes the lock swing 112 can also be flipped over with the vertical side of the lock swing 112 pointed downward and with the lock bolt housing 124 mounted on the top face of the horizontal side of the lock swing 112 as depicted in FIG. 32. This is in contrast to the way the lock swing 112 is mounted to the lock base 104 as depicted in FIG. 15. This will also give the bolt lock mechanism added height, without the use of the above described wooden block 151, if added height happens to be necessary in order for the lock bolt 134 to properly align with the upper horizontal rail 92. A more detailed description of the reason for adjusting the height of the bolt lock mechanism will be given in the operations section.

The rear support cross brace 145 is a 2"×2"×⅛"×57" angle aluminum, angle iron or a 57" wooden two by four (2"×4") mounted on two vertically standing ⅜"×12" threaded rods 157A and 157B (See FIGS. 1, 9, 18, 20 and 21). The two said threaded rods 157A and 157B are mounted on the load support rails 44A and 44B (See FIGS. 1 and 9). The two threaded rods 157A and 157B are inserted through any two of the six ⅜" rod holes that make up rod hole sets 159A and 159B (See FIGS. 1, 9 and 21). There are three said rod holes per said sets 159A and 159B and rod hole set 159A is bored center line through the horizontal side of the load support rail 44A. Rod hole set 159B is bored center line through the horizontal side of load support rail 44B. The first said rod holes of the two rod hole sets 159A and 159B are bored 4" on center in from the rear horizontal edges of the two load support rails 44A and 44B. The remainder of the said rod holes in the rod hole sets 159A and 159B are bored at one foot intervals on center forward along the horizontal side of the load support rails 44A and 44B (See FIGS. 1, 9 and 21).

The two threaded rods 157A and 157B are threaded their entire length and are secured to the load support rails 44A and 44B by means of the four ⅜" nuts 161A, 161B, 161C and 161D (See FIGS. 9, 20 and 18). With the ends of rods 157A and 157B inserted through any two of the rod holes in the sets 159A, 159B (inserted through one hole per set) the two ⅜" nuts 161A and 161B are screwed on to the bottom ends of said rods, with lock washers also included, and screwed up against the bottom horizontal face of the load support rails 44A and 44B. Two other nuts 161C and 161D along with two lock washers are installed on rods 157A and 157B and screwed down tight on the upper horizontal face of the load support rails 44A and 44B. This secures rods 157A and 157B standing in a vertical, perpendicular position to the load support rails 44A and 44B (See FIGS. 9 and 20). Mounted on the upper ends of rods 157A and 157B is the rear support cross brace 145. This rear support cross brace 145 is positioned cross way to the load support rails 44A and 44B (FIG. 9). The rear support cross brace 145 has two sets of ⅜" rod holes 163A and 163B (three holes per set) bored through its horizontal side (in the vicinity of each end). These said rod holes are positioned on the rear support cross brace 145 so that any two of said rod holes in rod hole sets 163A and 163B will align with any two of the same distanced rod holes in rod hole sets 159A and 159B bored through the horizontal sides of load support rails 44A and 44B (that is with the rear support brace 145 in its cross way position to the load support rails 44A and 44B, see FIGS. 1, 9 and 21). Rod hole sets 163A and 163B, bored through the horizontal side of the rear support cross brace 145, are spaced to match the varying horizontal distances between the rod hole sets 159A and 159B bored in the load support rails 44A and 44B.

In order for the rear support cross brace 145 to be secured to the upper ends of the rods 157A and 157B, ⅜" nuts 165A and 165B are installed on rods 157A and 157B and the lock washers or flat washers are placed on the upper face of nuts 165A and 165B. The rear support cross brace 145 is positioned on the two rods 157A and 157B with its lower horizontal face resting on the washers and nuts 165A and 165B (See FIGS. 9 and 20). Washers and nuts 165C and 165D are then installed on the upper ends of rods 157A and 157B and said nuts 165C and 165D are screwed down tight against the horizontal upper face of the cross brace 145 in position. If a wooden two by four (2"×4") is used as the rear support cross brace 145 it can be mounted laying broad face down or mounted resting on its edge. If a wooden two by four (2"×4") is used for the purpose of the rear support cross brace 145 the upper nuts 165C and 165D and respective flat washers can be countersunk in the wood in order to provide an unobstructed upper load bearing surface (See FIG. 20).

FIG. 22 shows the best description of the anti-bounce bumper. The anti-bounce bumper is designed to prevent the vertical movement or bouncing of the upper horizontal rail 92 on a vehicle's lowered tailgate by pressing against the lower face of a lowered tailgate (See FIG. 18). The anti-bounce bumper is mounted on spar 22 through any two of the six ½" threaded bolt holes that make up bolt hole set 167. Bolt hole set 167 is bored center line through the top and bottom horizontal sides of spar 22 and spaced apart 1" on center (three holes top side and three holes bottom side). This bolt hole set 167 is located on spar 22 between the vertical support assembly and the trailer hitch coupler 20 (See FIG. 2). This is the area immediately under the lower face of the lowered pickup truck tailgate. The threaded bolt hole set 167 provides the anti-bounce bumper with three different locations along spar 22 to be mounted in order to better accommodate different style and size tailgates (See FIGS. 18 and 10).

The ½"×10" bumper bolt 169 with a ½" nut 171A, including one lock washer, placed on it, is screwed through one of the top threaded bolt holes that make up bolt hole set 167 and then screwed through one of the aligned bottom threaded bolt holes that also make up said bolt hole set 167. Another ½" nut 171B, with a lock washer, is then screwed on the lower end of bumper bolt 169 (See FIG. 18). The bumper bolt 169 can be screwed to whatever height is needed above spar 22 and then secured in position by screwing the ½" nuts 171A and 171B tight against spar 22.

Mounted on the tip of bumper bolt 169 is a 2"×2"×1"×1/16" bumper base 175 made of either channel iron or channel aluminum (See FIG. 22). A 3/16" pin hole 173 is bored ¼" on center down from the threaded tip of bumper bolt 169. Bored dead center both vertical sides of the bumper base 175 are two 3/16" pin holes 177A and 177B, one pin hole per each side. A 2⅞"×3/16" pin 179 is inserted through pin hole 177A and then through pin hole 173 in bumper bolt 169 and then through pin hole 177B. Pin 179 has a 1/16" cotter pin hole 181 bored 3/16" down from its tip end. A flat washer is slipped over the tip of pin 179 and a cotter pin 183 is inserted through cotter pin hole 181 thus securing pin 179 in position. The other end of pin 179 has a flat head. Pin 179 secures bumper bolt 169 to bumper base 175 (See FIG. 22). The joint formed is rotatable, thus the 2"×2"×⅛" rubberized bumper 185 attached to the bumper base 175 can remain flat against the lower face of the lowered tailgate regardless of the angle of the bumper bolt 169 to the lower face of the vehicle's tailgate. The rubber bumper 185 is 2"×2"×⅛" and is attached to the bumper base 175 by two ⅛"×⅜" countersunk machine screws 187A and 187B. The rubber bumper 185 is attached to the 2"×2" base part, outside face, of the channel iron or channel aluminum bumper base 175 (See FIG. 22).

The rubber bumper 185 is pressed against the lower face of a lowered tailgate (See FIG. 18) by turning bumper bolt 169 through the threaded bolt holes that make up bolt hole set 167. Upon proper bumper bolt adjustment, nuts 171A and 171B, as stated earlier, are screwed tight against the upper face and bottom face of spar 22 to prevent bumper bolt 169 from turning farther (See FIG. 18).

FIGS. 18, 19, 20, 23, 24, 25 and 26 show a description of the load reliever chain set up. Two ten foot 2/0 double twist load reliever chains 189A and 189B are used in order to provide added support to the Truck Cargo Support Outrigger. Bored center line the horizontal side of the load support rails 44A and 44B, set 1½" on center in from the rear ends of the load support rails 44A and 44B are two ⅜" eye bolt holes 191A and 191B (not shown) (one said hole per each load support rail 44A and 44B). Inserted in each of these two eye bolt holes 191A and 191B are two ⅜"×2" eye bolts 193A and 193B (See FIGS. 1, 20, 9 and 18). The eye part of the eye bolts 193A and 193B is positioned downward and under the lower horizontal face of the horizontal side of the load support rails 44A and 44B. Lock washers and nuts are installed on each eye bolt 193A and 193B and tightened. Inserted through the eyes of the eye bolts 193A and 193B are the two ⅜"×8" eye bolts 195A and 195B (threaded their entire length) (See FIGS. 20, 18 and 9). The eye portion of these eye bolts 195A and 195B are positioned on the front side or truck side of the eye bolts 193A and 193B (See FIG. 20). Two large flat washers and two ⅜" nuts 194A and 194B are installed on the other ends of the eye bolts 195A and 195B. One said flat washer and one said nut per each eye bolt 195A and 195B. These said nuts 194A and 194B can be used to adjust the ⅜"×8" eye bolts 195A and 195B forward or rearward through the eyes of the eye bolts 193A and 193B.

Attached to the eye of each of the eye bolts 195A and 195B is a link of the two ten foot 2/0 double twist load reliever chains 189A and 189B (which ever link will result in the most slack being pulled out of said chains) (See FIGS. 20, 18 and 9). The forward ends of these same two said load reliever chains 189A and 189B have snap hooks 197A and 197B (one snap hook per each said chain) attached to their last forward most links. The snap hooks 197A and 197B are hooked to the pickup truck or wagon tailgate latch strikes (See FIGS. 19 and 9). The slack is pulled out of the chains 189A and 189B by running up the nuts 194A and 194B located on the threaded eye bolts 195A and 195B (See FIGS. 18 and 20). Assembled in this manner, the load reliever chains 189A and 189B can be tightened and thus lift the weight of a load off the pickup truck or wagon tailgate when heavy loads are being transported. The forward ends of the load reliever chains 189A and 189B can also be attached to wooden or metal posts placed in the two rear most stake holes in the vertical sides of the pickup truck bed (See FIG. 25). These post 221A and 221B are capable of providing a more sturdy anchor point for the forward ends of the load reliever chains 189A and 189B to the pickup truck than can be provided by the tailgate latch strikes. These post 221A and 221B have mounted through ⅜" holes, located in their upper ends, two ⅜"×8" eye bolts 217A and 217B (See FIG. 25). These threaded eye bolts 217A and 217B are identical to the already described eye bolts 195A and 195B mounted to the rear of the Truck Cargo Support Outrigger. These threaded eye bolts 217A and 217B are used as attachment points for the forward ends of the load reliever chains 189A and 189B to the rear of the pickup truck and can also be used to pull the slack out of the load reliever chains 189A and 189B by running the accompanying nuts 219A and 219B (flat washers included) up toward the eye portion of the said eye bolts 217A and 217B (See FIG. 25). These ⅜"×8" eye bolts 217A and 217B are used in conjunction with the ⅜"×8" eye bolts 195A and 195B which are, as described earlier, attached to the rear end of the two load support rails 44A and 44B. The rear ends of the load reliever chains 189A and 189B are attached to the eye bolts 195A and 195B while the forward ends of said chains are attached to the just described eye bolts 217A and 217B per the already mentioned snap hooks 197A and 197B or simply by one of the forward links in each of the load reliever chains 189A and 189B.

Since some pickup trucks, primarily small imported pickup trucks, do not have stake holes incorporated into the vertical sides of their truck beds another method can be used as a chain anchor point. This method utilizes a high board 215 (See FIGS. 23 and 24) or a low board 223 (See FIG. 26). The high board 215 is a 2" thick by 6" wide piece of lumber in which the ends are formed to conform to the upper inside and top edges of the vertical sides of the pickup truck bed. The high board 215 is mounted to the rear of the pickup truck as show in FIG. 23. Mounted through ⅜" holes located in the vicinity of the ends of the high board 215 are the two ⅜"×8" eye bolts 217A and 217B. These said eye bolts 217A and 217B serve as attachment points for the forward ends of the load reliever chains 189A and 189B. The accompanying nuts 219A and 219B, including flat washers, can, as stated earlier, be run up toward the eye portion of the eye bolts 217A and 217B and thus aid in pulling the slack out of the load reliever chains 189A and 189B and thereby lift weight off the pickup truck tailgate.

Figure 26:
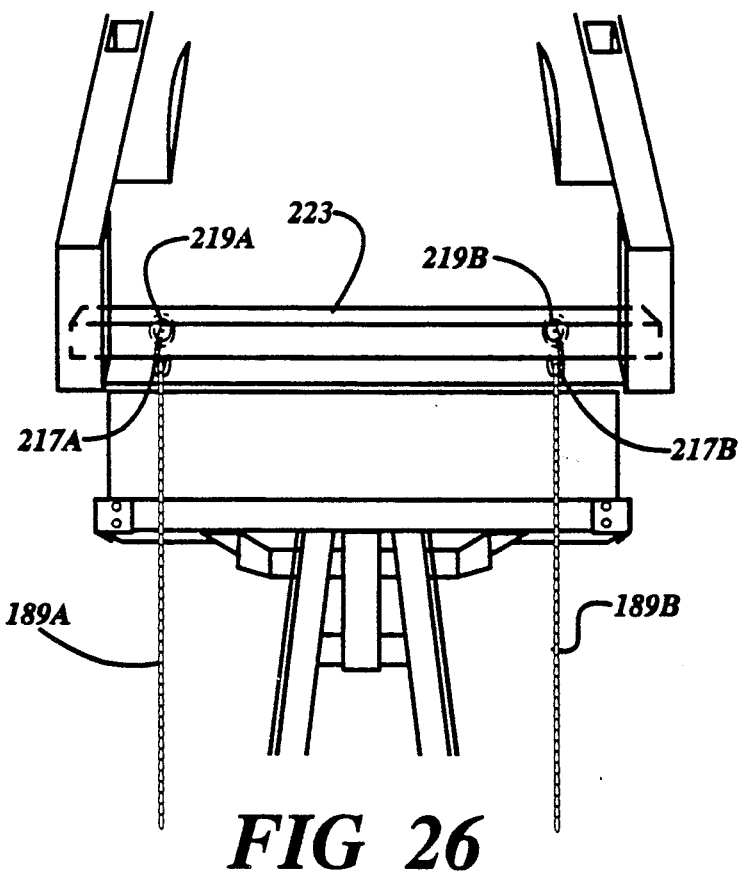
FIG. 26 shows a view of the lowboard 223 positioned on the rear floor portion of the pickup truck cargo bed. The lowboard serves as a attachment device for the forward ends of the load reliever chains 189A and 189B.

When it is necessary to haul a load or structure that will have to occupy the space normally occupied by the high board 215, the wooden two by four (2"×4") low board 223 can be substituted (See FIG. 26). The low board 223 lays on the rear of the pickup truck bed with its outer ends extended behind the rear most ends of the vertical sides of the pickup truck bed as shown in FIG. 26. The low board 223 is rigged with the same ⅜"×8" eye bolts 217A and 217B to serve the same purpose as they serve on the vertical post 221A and 221B and also on the high board 215.

A 2/0 double twist brace chain 198 is strung between the two rear ends of the two load support rails 44A and 44B (See FIGS. 9, 20, 21 and 1). Each end of this brace chain 198 is attached to each of the previously described ⅜"×2" eye bolts 193A and 193B that are attached to the rear portion, horizontal side, of the load support rails 44A and 44B. The last link on each end of brace chain 198 is attached to the eye portion of the eye bolts 193A and 193B (See FIG. 20). The brace chain 198 is approximately 45" long on the Truck Cargo Support Outrigger that has six foot load support rails 44A and 44B and approximately 52" long on the Truck Cargo Support Outrigger that has eight foot load support rails 44A and 44B.

Previous discussion has dealt with the Truck Cargo Support Outrigger being constructed entirely of steel (Rear support cross brace 145 being the exception). In order to reduce cost of construction and weight, some major structural members of the Truck Cargo Support Outrigger can be constructed out -of wood and the Truck Cargo Support Outrigger can still remain structurally very strong. The below description gives the construction technique when wooden two by fours (2"×4") are used in place of steel for the two load support rails 44A, 44B, spar 22, the middle cross brace 46 and the rear support cross brace 145.

Figure 16:
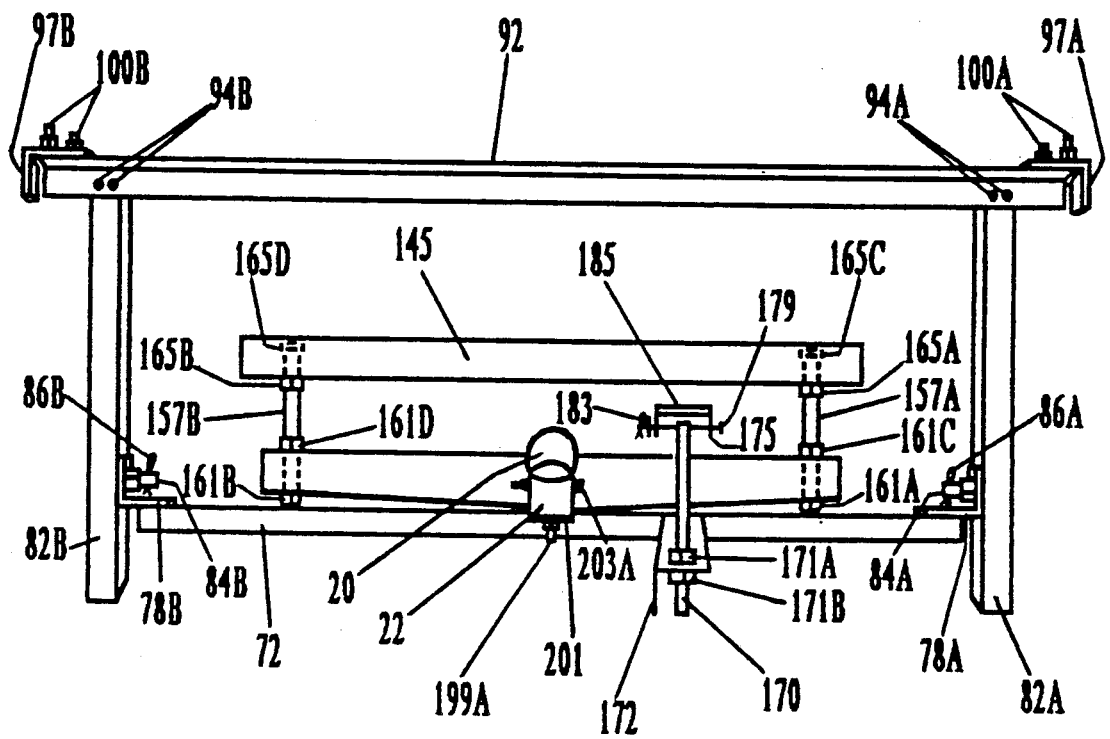
FIG. 16 is a front view of the partial wood model of the Truck Cargo Support Outrigger. Here the anti-bounce bumper mechanism is seen mounted to the right side of the base rail 72 rather than mounted on spar 22 as is the case for the all steel model of the Truck Cargo Support Outrigger. Also in this view the base rail 72 is shown to be longer than it actually is on the working model.
Figure 21:
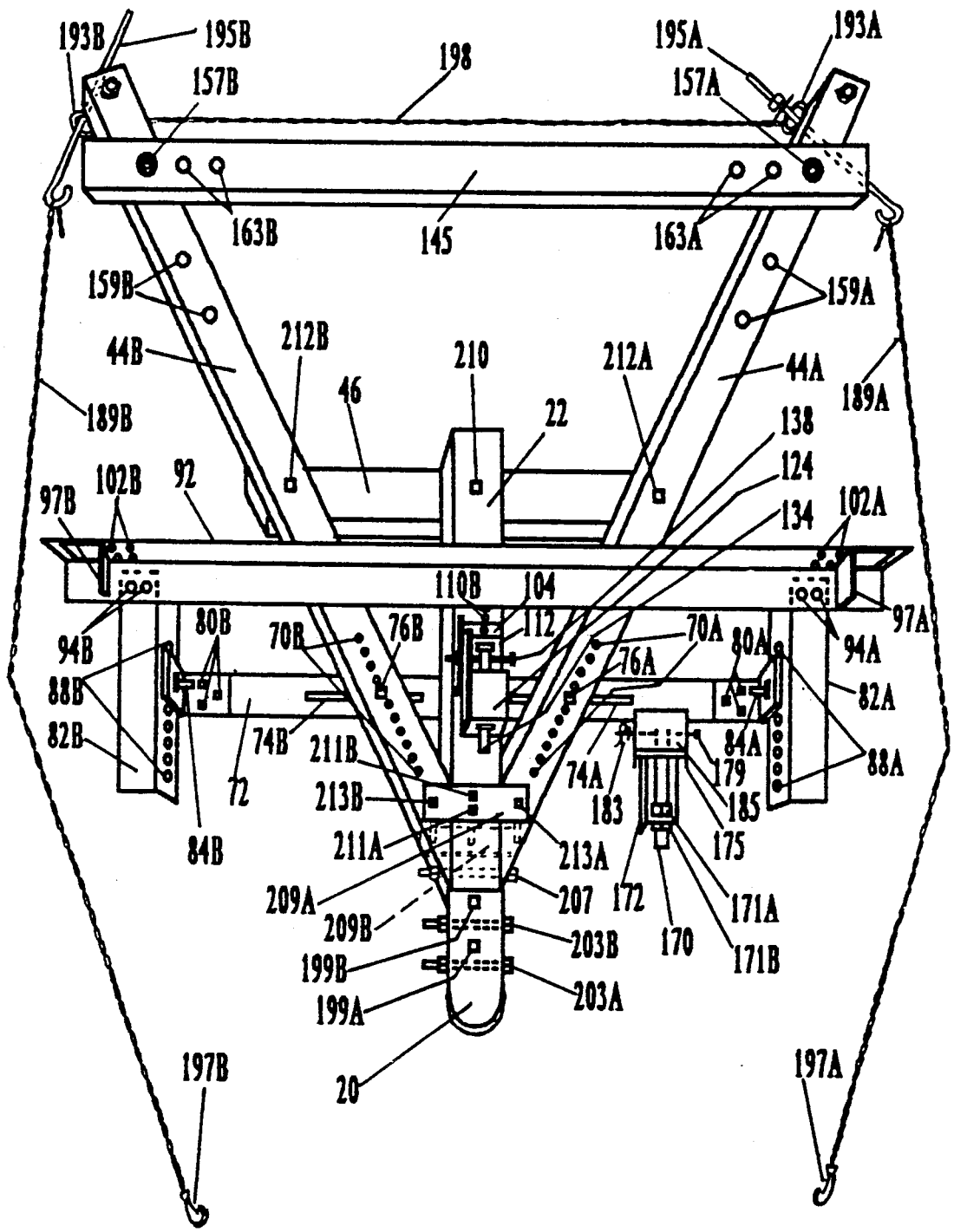
FIG. 21 is a view of the partial wooden model of the Truck Cargo Support Outrigger. Here wooden two by fours (2"×4") have been substituted for steel for the spar 22, middle cross brace 46, rear support cross brace 145 and the two load support rails 44A and 44B. Also the front cross brace 36 has been eliminated with the forward ends of the two load support rails 44A and 44B mitered and attached directly to the spar 22. Also the anti-bounce bumper mechanism can be seen mounted to the right side of the base rail 72 (front of outrigger looking to rear) per the bumper rod base 172.

Bolting the trailer hitch coupler 20 to a wooden 2"×4"×37" spar 22 requires four bolts (See FIGS. 21 and 16). With the 2"×4"×37" wooden spar 22 on edge and with large flat washers installed, two ¼"×4½" bolts 199A and 199B are inserted through the top side of the steel trailer coupler hitch 20 and then vertically through the top edge of the 2"×4"×37" wooden spar 22 and on through to the bottom edge of the 2"×4"×37" wooden spar 22 and then through a 2"×4"×¼" steel plate 201. When the lock washers and nuts on these two bolts 199A and 199B are run up tight, the forward end of the 2"×4"×37" wooden spar 22 is given the necessary strength to prevent splitting while under stress (See FIGS. 21 and 16). Two other ⅜"×3" bolts 203A and 203B are inserted horizontally through the vertical side of the steel trailer hitch coupler 20 and then horizontally through the vertical side of the two by four (2"×4") wooden spar 22 and then through the other vertical side of the trailer hitch coupler 20. Lock washers and nuts are installed. This gives proper strength to the joining of the steel trailer hitch coupler 20 to the forward end of the 2"×4"×37" wooden spar 22 (See FIGS. 21 and 16). Wooden shims 205A and 205B (4½"×3"×¼") (not shown) are used in the open space between the vertical sides of the trailer hitch coupler 20 and the vertical sides of the 2"×4" wooden spar 22. These shims are needed because generally any wooden two by four available for use as spar 22 will have been dressed to the point where it will actually be less than 2" thick.

Attaching the wooden 2"×4"×8' load support rails 44A and 44B to the wooden spar 22 is accomplished by mitering the forward ends of the wooden load support rails 44A and 44B to the proper angle and attaching them (the forward ends) to the wooden spar 22, 4½" from the forward end of spar 22 (See FIG. 21). The attachment is made by inserting a ⅜"×4½" bolt 207, with a flat washer installed, horizontally through the wooden load support rail 44A at a point 3" from its forward end, center line, and then inserting this same bolt 207 horizontally through the wooden spar 22 at a point 7½" from its forward end, center line, and then inserting this same bolt 207 on through the wooden load support rail 44B at a point 3" from its forward end, center line. A flat washer and nut are installed and tightened. The washers will sink flat in the wood when the nut is tightened. The two wooden load support rails 44A and 44B are attached to the two opposite vertical sides of the wooden spar 22 and extend rearward to form a V shape (See FIG. 21).

At a point 7¾" from the front end of the wooden spar 22, two 2"×4"×¼" steel plates 209A and 209B are placed on the top and bottom edges of the wooden spar 22. These said steel plates 209A and 209B are placed perpendicular to the wooden spar 22 and extend out over both the bottom and top edges of the two wooden load support rails 44A and 44B (See FIG. 21). One ¼"×5" bolt 211A is inserted through the top steel plate 209A, center line, ½" in from the forward edge of said steel plate 209A and then vertically through the wooden spar 22 and on through the bottom steel plate 209B, center line, ½" in from the forward edge of said steel plate 209B. A lock washer and nut is installed. A second ¼"×5" bolt 211B is inserted through the top steel plate 209A, center line, ½" in from the rearward edge of said top steel plate 209A and then vertically through the wooden spar 22 and on through the bottom steel plate 209B, center line, ½" in from the rearward edge of said steel plate 209B. A lock washer and nut is installed (See FIG. 21).

As previously stated, the outer ends of the 2"×4"×¼" steel plates 209A and 209B extend out over the top and bottom edges of the two wooden load support rails 44A and 44B (See FIG. 21). A ¼"×5" bolt 213A is inserted through the right side (front of outrigger looking toward rear of outrigger) of the top steel plate 209A, center line, ½" in from the right outside end of the top steel plate 209A. This same bolt 213A is then inserted vertically through the wooden load support rail 44A and then on through the right side of the bottom steel plate 209B, center line, ½" in from the right outside end of said bottom steel plate 209B. A lock washer and nut is installed. A ¼"×5" bolt 213B is inserted through the left side (front of outrigger looking toward the rear of outrigger) of the top steel plate 209A, centerline, ½" in from the left outside end of said top steel plate 209A. Bolt 213B is then inserted vertically through the wooden load support rail 44B and then on through the left side of the bottom steel plate 209B, center line, ½" in from the left outside end of said bottom steel plate 209B. A lock washer and nut is installed (See FIG. 21).

The rear end of the wooden two by four (2"×4") spar 22 is attached to a wooden two by four (2"×4") middle cross brace 46 (See FIG. 21). The wooden two by four (2"×4") middle cross brace 46 is 20" long and attached at its outer ends to the two wooden two by four (2"×4") load support rails 44A and 44B (See FIG. 21). The attachment of the wooden two by four (2"×4") spar 22 to the wooden two by four (2"×4") middle cross brace 46 is accomplished by a 5/16"×6½" bolt 210. The attachment of the two outer ends of the wooden two by four (2"×4") middle cross brace 46 to the two wooden two by four (2"×4") load support rails 44A and 44B is accomplished by the use of two ¼×6½" bolts 212A and 212B (one on either side). The assembly and attachment technique (spar 22 to middle cross brace 46, middle cross brace 46 to load support rails 44A and 44B) is the same as previously described for the all steel model of the Truck Cargo Support Outrigger. The wooden two by four (2"×4") middle cross brace 46 is attached broad face against the lower narrow edge of the wooden two by four (2"×4") load support rails 44A and 44B and the wooden two by four (2"×4") spar 22 (See FIG. 21).

The above descriptions given in the last several paragraphs provides the assembly of the two wooden load support rails 44A and 44B to the wooden spar 22 with a junction that is very strong, tight and free of play.

Anti-bounce capability for the partial wooden model of the Truck Cargo Support Outrigger is provided by an anti-bounce mechanism that is very similar to the one found on page 47 and 48 (this section) for the all steel model of the Truck Cargo Support Outrigger. The bumper bolt 169 of the anti-bounce bumper mechanism on the all steel model of the Truck Cargo Support Outrigger is mounted through the steel spar 22, however, on the partial wooden model of the Truck Cargo Support Outrigger the anti-bounce bumper mechanism is not mounted on the spar 22 (See FIGS. 21 and 16). A ½"×10" threaded steel bumper rod 170 with the bumper base 175 and rubber bumper 185 mounted to one end is mounted through one of four ½" rod holes (Rod hole set 174) bored through a 1½"×1½"×¼"×6¼" piece of angle iron call the bumper rod base 172. This bumper rod base 172 is either welded or bolted to the base rail 72 of the vertical support assembly 5½" from the right end of base rail 72 (front of outrigger looking to rear). The bumper rod base 172 protrudes forward under the lowered pickup truck or wagon tailgate (See FIGS. 21 and 16).

Four ½" rod holes that make up rod hole set 174 are bored through the horizontal side of bumper rod base 172 (See FIG. 17). The four ½" rod holes in rod hole set 174 are bored center line the bumper rod base 172, horizontal side, spaced 1" on center. The edge of the first ½" rod hole in rod hole set 174 is placed ¼" from the forward horizontal end of bumper rod base 172.

The bumper rod 170 is threaded its entire length, 10" long and has the bumper base 175 and the rubber bumper 185 mounted on one end the same way they are sized, assembled and mounted on the bumper bolt 169 described for the all steel model of the Truck Cargo Support Outrigger on page 47 and 48 of this description section. With a ½" nut 171A (lock washer included) screwed on to bumper rod 170, bumper rod 170 is inserted vertically into any one of the four ½" rod holes that make up rod hole set 174 bored in the bumper rod base 172 (See FIG. 17). While the ½" nut 171A (lock washer included) is resting against the upper face of the bumper rod base 172 another ½" nut 171B (lock washer included) is screwed onto the lower end of bumper rod 170. The ½" nut 171B is screwed up tight against the bottom face of the bumper rod base 172. Bumper rod 170 is thus mounted in its vertical position (FIGS. 17, 16 and 21).

The remainder of the construction technique of this partial wooden model of the Truck Cargo Support Outrigger remains the same as that of the all steel version of the Truck Cargo Support Outrigger (See FIG. 21). All the components of the vertical support assembly and the pivotal bolt lock mechanism remain steel However, 1½"×1½"×¼" angle iron is used for the vertical support assembly on the partial wooden model of the Truck Cargo Support Outrigger. This is instead of the 2"×2"×¼" angle iron or angle aluminum used for the vertical support assembly on the all steel model of the Truck Cargo Support Outrigger. Also the threaded rods 157A and 157B that the rear support cross brace 145 is mounted on are ½" in diameter on the partial wood model of the Truck Cargo Support Outrigger rather than ⅜" in diameter as they are on the all steel model of the Truck Cargo Support Outrigger. The rod hole sets 159A and 159B which are bored in the horizontal side of load support rails 44A and 44B are ½" in diameter on the partial wood model of the Truck Cargo Support Outrigger rather than ⅜" in diameter as they are on the all steel model of the Truck Cargo Support Outrigger. The same applies to the rod hole sets 163A and 163B bored in the rear support cross brace 145 on the partial wood model of the Truck Cargo Support Outrigger. Also the ⅜" eye bolts 193A and 193B are extended in length to 4½" on the partial wood model of Truck Cargo Support Outrigger. The ¼" bolts 76A and 76B are extended to 5". The dimensions of the steel component parts of the pivotal bolt lock mechanism are the same for the partial wood model of the Truck Cargo Support Outrigger as they are for the all steel model of the Truck Cargo Support Outrigger. For the purpose of road safety electrical taillights and turn signals are mounted to the rear of the Truck Cargo Support Outrigger. Also a bright colored flag is attached to the rear end of each of the load support rails 44A and 44B.

OPERATION OF TRUCK CARGO SUPPORT OUTRIGGER

The Truck Cargo Support Outrigger consist of three primary interconnected sections: A. Horizontal load support assembly. B. Vertical support assembly. Pivotal bolt locking mechanism.

Horizontal load support assembly

The Truck Cargo Support Outrigger of FIG. 1 comprises a trailer hitch coupler 20 which is of the standard type and is attached to the forward end of metal spar 22 either by welding or by two ⅜"×3" bolts 24A and 24B (See FIGS. 1 and 2). The purpose of the trailer hitch coupler 20 is to provide a means of coupling the Truck Cargo Support Outrigger to the trailer hitch coupler ball of a pickup truck or a wagon type vehicle with a drop down tailgate and thereby securing the Truck Cargo Support Outrigger to the vehicle (See FIGS. 9 and 18). If the Truck Cargo Support Outrigger is mounted to a wagon type vehicle it will have to be one of the older model Ford Broncos, Chevrolet Blazers etc. that utilize the drop down trailgates. The newer model wagon type vehicles are no longer manufactured with tailgates. The Truck Cargo Support Outrigger will be use primarily on pickup trucks.

The 2"×2"×⅛"×30" square shaped steel spar 22 serves the purpose of providing a central beam for the attachment of other component parts and to provide added strength and support, especially vertical support, to the Truck Cargo Support Outrigger (See FIG. 2). The spar 22 receives its support from the vertical support assembly which will be explained later. Attached, per two 5/16"×3½" bolts 30A and 30B, beginning at a point 1½" from the front end edge of spar 22, is the 4"×4"×¼" steel anti-twist plate 28 (See FIG. 2). The purpose of the anti-twist plate 28 is to provide added space for the attachment of the front cross brace 36, thus giving said front cross brace 36 more strength at its attachment points and eliminating possible twisting action of the said front cross brace 36 while under a stress load (See FIG. 2). The 2"×2"×⅛"×12" angle steel front crose brace 36 provides a forward attachment base for the two load support rails 44A and 44B (See FIGS. 1 and 2). The front cross brace 36 is attached to the anti-twist plate 28 by means of two ¼"×¾" bolts 38A and 38B. The anti-twist plate 28 can be eliminated if the front cross brace 36 is welded directly to spar 22.

Attached to the two ends of the front cross brace 36 are the forward ends of the two 2"×2"×⅛"×6' or 8' (whichever is preferred) load support rails 44A and 44B (See FIGS. 1 and 2). The purpose of the two load support rails 44A and 44B is to provide weight supporting ability far beyond the rear edge of a vehicles lowered tailgate. These two load support rails 44A and 44B are attached to the ends of the front cross brace 36 by two 5/16"×1" bolts 54A and 54B as explained in the descriptive section pages 23 and 24. Both bolts 54A and 54B include 1/16" safety cotter pins 56A and 56B in addition to their respective washers and nuts (See FIG. 18). Upon installation of bolts 54A and 54B and their respective washers and nuts, the 1/16" safety cotter pins 56A and 56B are inserted into 1/16" holes 58A and 58B (not shown) borded ⅛" down fron the threaded tips of bolts 54A and 54B. The attachment points of the forward ends of the two load support rails 44A and 44B to the ends of the front cross brace 36 forms a hinge whereby the two load support rails 44A and 44B can be swung from their V shaped formation back together against one another for the purpose of reducing the size of the Truck Cargo Support Outrigger to facilitate the storage of the unit. Since the said joints are not static, but rotatable, the safety cotter pins 56A and 56B are utilized to prevent the respective nuts from working off bolts 54A and 54B. When the Truck Cargo Support Outrigger is in use the nuts on bolts 54A and 54B should be run up tight to give the said joints strength. The bolt's 54A and 54B respective nuts can be loosened for the purpose of allowing the said joints to be easily rotatable.

Attached to the rear end of spar 22 and perpendicular to said spar 22 is the middle cross brace 46 (See FIGS. 1, 2 and 9). The middle cross brace 46 is attached to spar 22 by a 5/16"×3" bolt 48 (See FIGS. 1, 2 and 9). Bolt 48 is first inserted through two 5/16" bolt holes (not shown) that make up the bolt hole set 51 bored through the top and bottom sides of spar 22. Bolt 48 is then inserted through a 5/16" bolt hole 52 (not shown) bored in middle cross brace 46. Bolt 48 includes one flat washer as well as one lock washer and nut which are installed. The flat washer is locaded on the bolt head side of bolt 48 and the lock washer is located on the nut side. Bolt 48 also includes a safety cotter pin 49 (See FIG. 10) inserted through a 1/16" hole 50 (not shown) which is bored ⅛" from the threaded tip of bolt 48. The joint formed where spar 22 is bolted to the middle cross brace 46 can be made rotatable by loosening the nut on bolt 48. The safety cotter pin 49 will prevent the said nut from coming all the way off. Per this said rotatable joint the middle cross brace 46 can be rotated from its position perpendicular to spar 22 to a position directly in line with spar 22 for the purpose of reducing the overall size of the Truck Cargo Support Outrigger in order to facilitate storing of the said unit. The nut on bolt 48 should be run up tight while the Truck Cargo Support Outrigger is in operation. Both ends of the middle cross brace 46 are attached to the two load support rails 44A and 44B by means of the two ¼"×¾" bolts 64A and 64B including one lock washer and nut per bolt (See FIGS. 1, 2 and 9). These two said attachment points are 25¼" rearward from the forward ends of the load support rails 44A 44A and 44B. Bolts 64A and 64B are inserted through ¼" bolt holes 66A and 66B (not shown) bored in the load support rails 44A and 44B. Bolts 64A and 64B are then inserted through ¼" bolt holes 68A and 68B (not shown) bored in the ends of the middle cross brace 46. The respective lock washers and nuts are then installed on bolts 64A and 64B. Bolts 64A and 64B have to be completely removed in order for the middle cross brace 46 to be rotated around to its storage position. The purpose of the middle cross brace 46 is to extend added rearward support to the two load support rails 44A and 44B. By virtue of the fact that the middle cross brace 46 is attached to spar 22 it is able to extend added vertical support to the load support rails 44A and 44B (How to be explained later). The middle cross brace 46 also secures the two load support rails 44A and 44B in the V shaped position (See FIGS. 1, 2 and 9).

The two 6' (or 8'/ whichever is preferred) load support rails 44A and 44B provide weight supporting ability far beyond the rear edge of a pickup truck's lowered tailgate and thus provide a base for mounting a 57" rear support cross brace 145 (See FIGS. 1, 9, 18 and 20). The rear support cross brace 145 can be attached at various points along the two load support rails 44A and 44B, per rod hole sets 159A and 159B, with its rear most attachment point being 4" from the very rear end of the two load support rails 44A and 44B. The rod hole sets 159A and 159B will be explainded later. The rear support cross brace 145 is mounted cross ways to the load support rails 44A and 44B. The said rear support cross brace 145 provides an outboard resting or support surface for long pieces of materials or structures being hauled in a pickup truck bed but which extend well beyond the rear edge of the lowered tailgate. The closer the rear support cross brace 145 is mounted to the forward end of the Truck Cargo Support Outrigger the more weight the Truck Cargo Support Outrigger can support. The more rearward the rear support cross brace 145 is mounted on the load support rails 44A and 44B or, in other words, the further away from the pickup truck bed the rear support cross brace is mounted, the less weight the Truck Cargo Support Outrigger will be able to support.

The rear support cross brace 145 is a 2"×2"×⅛"×57" piece of angle aluminum or angle iron or even a 57" wooden two by four (2"×4") mounted on two vertically standing ⅜"×12" threaded rods 157A and 157B (See FIGS. 9, 20, 18). The length of the two threaded rods 157A and 157B being such as to allow vertical adjustment of the rear support cross brace 145 (adjustment means explained later). The two threaded rods 157A, 157B are mounted on the load support rails 44A and 44B. The two threaded rods 157A and 157B are inserted through any two of the six ⅜" rod holes that make up rod hole sets 159A and 159B (See FIGS. 1, 9, 21). There are three rod holes per said set and one set 159A is bored through the horizontal side of load support rail 44A. Rod hole set 159B is bored through the horizontal side of load support rail 44B. The first rod holes of the two rod hole sets 159A and 159B are bored 4" on center in from the rear horizontal ends of the two load support rails 44A and 44B. The remainder of the said rod holes in rod hole sets 159A and 159B are bored at one foot intervals, on center, along the horizontal sides of load support rails 44A and 44B (See FIGS. 1, 9 and 21). These rod hole sets 159A and 159B allow the threaded rods 157A and 157B to be mounted across from each other at various locations along the load support rails 44A and 44B (one said rod per each said load support rail). The rear support cross brace 145, attached to said rods 157A and 157B, can be positioned at these various points along the load support rails 44A and 44B in order to accommodate various lengths and weights of materials being hauled in a pickup truck or a wagon type vehicle with a drop down tailgate. Changing the location of the rear support cross brace 145 on the load support rails 44A and 44B necessitates a seperate set of rod holes (sets 163A and 163B) bored through the horizontal side of the rear support cross brace 145. Rod hole sets 163A and 163B will be explained shortly (See FIG. 1).

The two threaded rods 157A and 157B are threaded their entire length and are secured to the load support rails 44A and 44B by four ⅜" nuts 161A, 161B, 161C, 161D and their respective washers (See FIGS. 9, 20 and 18). With the bottom ends of rods 157A and 157B inserted through any two of the rod holes in rod hole sets 159A and 159B, the two ⅜" nuts 161A and 161B are screwed on to the bottom ends of said rods and screwed up 44A and 44B (⅜" lock washres are also included). Two other nuts 161C and 161D along with two ⅜" lock washers are installed on rods 157A and 157B and screwed down tight on the upper horizontal face of the load support rails 44A and 44B. This secures rods 157A and 157B standing in a perpendicular position to the load support rails 44A and 44B ( See FIGS. 18, 20 and 9).

Mounted on the upper ends of rods 157A and 157B is the rear support cross brace 145, its function being described earlier. This rear support cross brace 145 is positioned cross ways to the load support rails 44A and 44B. The rear support cross brace 145 has two sets of ⅜" rods holes 163A and 163B (three holes per set) bored through its horizontal side (See FIGS. 1, 9 and 21). These said rod holes in rod hole sets 163A and 163B are positioned on the rear support cross brace 145 so that any two of these said rod holes in rod hole sets 163A and 163B will align with any two of the same distanced rod holes in rod hole sets 159A and 159B bored through the horizontal side of the load support rails 44A and 44B (that is with the rear support cross brace 145 in its cross way position to the load support rails 44A and 44B) (See FIGS. 1, 9 and 21). Rod hole sets 163A and 163B bored through the horizontal side of the rear support cross brace 145 are necessary to match the varying horizontal distances between the rod hole sets 159A and 159B bored through the horizontal sides of the load support rails 44B and 44B.

In order for the rear support cross brace 145 to be secured to the upper ends of the rods 157A and 157B, nuts 165A, 165B are installed on rods 157A, 157B and flat washers (lock washers if rear support cross brace is made of metal) are placed on the upper face of nuts 165A and 165B. The rear support cross brace 145 is positioned on the two rods 157A and 157B with its lower face resting on lock or flat washers and nuts 165A and 165B (See FIGS. 9, 20 and 18). Lock or flat washers and nuts 165C and 165D are then installed on the upper ends of rods 157A and 157B and said nuts are screwed down tight against the upper face of the rear support cross brace 145 thus securing the rear support cross brace 145 in position (See FIGS. 9, 20, 18 and 21). If a wooden two by four (2"×4") is used as the rear support cross brace 145 it can be mounted laying broad face down or mounted resting on its edge. If a wooden two by four is used for the purpose of the rear support cross brace 145, the upper nuts 165C and 165D and respective flat washers can be countersunk in the wood in order to provide an unobstructed upper load bearing surface.

The rear support cross brace 145 can be adjusted up or down in order to align it to the truck bed level by loosening nuts 161A, 161B, 161C, 161D and raising or lowering rods 157A and 157B through the rod holes in rod hole sets 159A and 159B bored through the horizontal sides of the load support rails 44A and 44B. The said rods are resecured by retighting nuts 161A, 161B, 161C and 161D. As described earlier the rear support cross brace 145, mounted on rods 157A and 157B, can be positioned at different locations along the load support rails 44A and 44B per the rod hole sets 159A and 159B (also already described) bored through the horizontal sides of the load support rails 44A and 44B. As mentioned this forward or rearward adjustment of the rear support cross brace 145 along the load support rails 44A and 44B allows the rear support cross brace 145 to be appropriately positioned to accommodate different lengths of cargo materails or structures needing support.

Vertical support assembly

Spar 22 as well as the load support rails 44A and 44B gain a portion of their vertical load bearing capability by virtue of the fact that they rest on the base rail 72 of the vertical support assembly (See FIGS. 1, 9 and 21). Load reliever chains 189A and 189B (See FIG. 9) provide the bulk of the vertical support when heavier loads are being supported by the Truck Cargo Support Outrigger. However, if lighter materials are being hauled such as plastic pipe, gutters or house trim etc. the load reliever chains generally will not be required simply because pickup truck tailgates can handle the weight of these lighter materials without the assistance of the load reliever chains. This load reliever chain set up will be explained later. The vertical support assembly is constructed in order to provide a method of suspending the two load support rails 44A, 44B and other related parts already described from the pickup truck's or wagon's lowered tailgate (See FIGS. 1, 9, 18 and 21). It is also designed to prevent side sway of the Truck Cargo Support Outrigger as a complete unit.

The base rail 72 of the vertical support assembly provides a support base for the two load support rails 44A and 44B as well as for the spar 22. The two L pieces 78A and 78B are attached to each end of the base rail 72, horizontal side, upper face (See FIGS. 3, 7 and 8). The two L pieces 78A and 78B serve to attach the base rail 72 to the vertical arms 82A and 82B (See FIGS. 3, 7 and 8). The two L pieces 78A and 78B are attached to base rail 72 by the six ¼"×¾" bolts that make up bolt sets 80A and 80B (Two sets, three said bolts per set) (See FIG. 3). Each said bolt in sets 80A and 80B includes one lock washer and nut. The two sets of bolts 80A and 80B are inserted through two sets of ¼" bolt holes 81A and 81B (Three holes per set / not shown) bored through horizontal side of the L pieces 78A and 78B. Bolt sets 80A and 80B are then inserted through two sets of ¼" bolt holes 83A and 83B (Three holes per set / not shown) bored through the horizontal side of the base rail 72. Respective lock washers and nuts are installed. The welding of the L pieces 78A and 78B to the base rail 72 would eliminate the need for bolt sets 80A, 80B and their respective bolt hole sets 81A, 81B, 83A and 83B.

The two L pieces 78A and 78B are attached to the two vertical arms 82A and 82B of the vertical support assembly by two ⅜"×1⅜" bolts 84A and 84B consisting of two flat washers and one nut per each bolt 84A and 84B. There is also one safety cotter pin 86A and 86B per each bolt 84A and 84B (See FIGS. 3 and 8). The two bolts 84A and 84B, with one flat washer installed per each said bolt, are inserted into the two ⅜" bolt holes 87A and 87B (not shown). Bolt hole 87A is bored through the center of the vertical side of the L piece 78A and bolt hole 87B is bored though the center of the vertical side of the L piece 78B. The two bolts 84A and 84B are then inserted through two of the twenty ⅜" bolt holes that make up two ⅜" bolt hole sets 88A and 88B. There are ten bolt holes per each set 88A and 88B (See FIGS. 3, 7 and 1). Bolt hole sets 88A and 88B are bored center line and spaced ⅝" on center vertically through the inside sides of the vertical arms 82A and 82B. There are ten said ⅜" bolt holes bored in each vertical arm 82A and 82B. Bolt hole set 88A is bored in vertical arm 82A and bolt hole set 88B is bored in vertical arm 82B. Upon the insertion of bolts 84A and 84B into bolt holes 87A, 87B and into bolt holes sets 88A and 88B as described above, the remaining flat washers are installed on each bolt 84A and 84B along with the respective nuts. The safety cotter pins 86A and 86B (See FIG. 3) are then inserted in 1/16" holes 90A and 90B (not shown) bored ¼" from the threaded tip ends of bolts 84A and 84B (See FIG. 8). This attachment of the L pieces 78A and 78B to the vertical arms 82A and 82B by the two bolts 84A and 84B forms a rotatable joint whereby the vertical support assembly can be rotated forward and rearward. This rotation capability provides an easy and quick method of mounting or dismounting the upper horizontal rail 92, of the vertical support assembly, either on or off the skyward face of the lowered pickup truck tailgate (See FIGS. 9 and 18).

The downward horizontal face of the upper horizontal rail 92 rest on the skyward face of the lowered pickup truck tailgate (See FIGS. 18 and 9). This point of juncture with the lowered pickup truck tailgate suspends the Truck Cargo Support Outrigger from the truck tailgate. The vertical arms 82A and 82B of the vertical support assembly serve to attach the base rail 72 to the upper horizontal rail 92 (See FIG. 3). The two vertical arms 82A and 82B are attached to the upper horizontal rail 92 per the countersunk machine screw sets 94A and 94B. There are two machine screws per each said set (See FIG. 3). The vertical support assembly has to be capable of being adjusted up and down when standing in its straight up or vertical position in order to accommodate the different vertical distances on different model pickup trucks (or wagons) between the truck's bumper hitch and the truck's lowered tailgate. This vertical adjustment capability also allows the rear support cross brace 145, which is attached to the two load support rails 44A and 44B, to be raised or lowered to the pickup truck's bed level (See FIG. 18). As stated earlier this rear support cross brace 145 serves as an outboard resting or support surface for any extended pieces of materials or structures being hauled in a pickup truck. Also, as described earlier, the rear support cross brace 145 can be adjusted up or down to pickup truck bed level independent of the vertical support assembly per the threaded rods 157A and 157B.

The up or down adjustment of the vertical support assembly is accomplished by the two sets of bolts holes 88A and 88B, already described, bored in a straight vertical line through the inside sides of the vertical arms 82A and 82B that help make up the vertical support assembly (See FIGS. 3 and 7). Per these bolt hole sets 88A and 88B, the base rail 72 of the vertical support assembly can be secured by the bolts 84A and 84B (described earlier) at various positions along the sides of the two vertically standing vertical arms 82A and 82B. Since the two load support rails 44A and 44B rest on the base rail 72 of the vertical support assembly, this upward or downward attachment of the vertical support assemblie's base rail 72 will lower or raise the height of the two load support rails 44A and 44B. This in turn adjust the height of the rear support cross brace 145 (See FIGS. 1, 3, 7, 8 and 18). This above described adjustment procedure also allows adjustment for the proper clearance of the Truck Cargo Support Outrigger under the pickup truck or wagon tailgate.

The vertical support assembly must also be capable of being adjusted either toward the rear of the two load support rails 44A and 44B or toward the front of the two load support rails 44A and 44B in order to accommodate various size (length) pickup truck (or wagon) tailgates or to accommodate the various distances on different model pickup trucks (or wagons) from the trailer hitch coupler ball to the rear edge of the lowered pickup truck (or wagon) tailgate. Since the two load support rails 44A and 44B rest on the base rail 72 of the vertical support assembly, this rearward or forward adjustment is accomplished by bolting the base rail 72 at different locations along the load support rails 44A and 44B thus giving the vertical support assembly its proper position relative to the lowered pickup truck or wagon tailgate (See FIGS. 1, 2, and 9). This forward or rearward adjustment of the vertical support assembly is possible per two sets of bolt holes 70A and 70B which have eleven ¼" bolt holes per said set. These bolt hole sets 70A and 70B are bored center line, spaced ½" apart on center, through the horizontal side of each of the load support rails 44A and 44B. The ¼" bolt hole set 70A is located in the load support rail 44A and the ¼" bolt hole set 70B is located in the load support rail 44B (more dimensional detail given in description section). The purpose of these two ¼" bolt hole sets 70A and 70B is to accept ¼"×¾" bolts 76A and 76B to secure the vertical support assembly base rail 72 at different locations along the load support rails 44A and 44B (See FIGS. 2, 1 and 9). In order to be able to bolt the vertical support assembly, which includes base rail 72, at different locations along the load support rails 44A and 44B two slots 74A and 74B are cut in the horizontal side of the base rail 72 of the vertical support assembly. Slots 74A and 74B are needed in order to accommodate the varying horizontal distances between the bolt holes in the bolt hole sets 70A and 70B bored through the horizontal side of the load support rails 44A and 44B (See FIGS. 3, 1, 7, 9 and 21). The two load support rails 44A and 44B form a V shape and this results in the varying horizontal distances between the bolt holes in the bolt hole sets 70A and 70B referred to above. The two slots 74A and 74B are cut in a straight line, center line through the horizontal side of the base rail 72 (See FIG. 3). These two slots 74A and 74B are ¼" wide by 4" long and begin at a point 3¼" in from the outside ends of the horizontal side of the base rail 72. The ¼"×¾" bolts 76A and 76B are inserted through the desired bolt holes that make up bolt hole sets 70A and 70B (described above) bored through the horizontal side of the load support rails 44A and 44B. These same bolts 76A and 76B are then inserted through the slot sets 74A and 74B cut, as described above, in the base rail 72 (See FIGS. 1, 9 and 21).

The 2"×2"×⅛"×57" angle aluminum or angle iron upper horizontal rail 92 of the vertical support assembly has as its primary function the ability to have its downward horizontal face rest on the skyward face of the lowered pickup truck tailgate (See FIGS. 18 and 9). This point of juncture with the lowered pickup truck tailgate, as stated earlier, suspends the Truck Cargo Support Outrigger from the pickup truck tailgate. A pickup truck (or wagon) tailgate is supported at its outer ends by supporting braces place there by the pickup truck manufacturer. The upper horizontal rail 92 is long enough to extend out to these said supporting points in order that the center portion of the tailgate is not supporting all the weight (See FIG. 9).

Anchored to the bottom face of the horizontal side of the upper horizontal rail 92 is a 2"×1/16"×57" hard rubber finish protector strip 136 (See FIG. 18). This rubber finish protector strip 136 serves the purpose of protecting the finish on a pickup truck tailgate. This rubber finish protector strip 136 is held in place by glue. Small countersunk machine screws could be used to hold the said finish protector strip 136 in place, however, gluing is the easier and least expensive method. Bored in the rubber finish protector strip 136 are a group of ¼" holes that make up hole sets 137A and 137B (not shown). The ¼" holes of the hole sets 137A and 137B are bored to align with the ¼" machine screw holes that make up the ¼" machine screw hole sets 102A and 102B bored through the horizontal side of the upper horizontal rail 92 (See FIG. 3). Hole sets 137A and 137B allow for the insertion and removal of the machine screw sets 100A and 100B from the machine screw hole sets 102A and 102B bored through the horizontal side of the upper horizontal rail 92. Machine screw sets 100A and 100B are used in conjunction with the L shaped anti-sway caps 97A and 97B. (See FIG. 3).

Suspended from the pickup truck or wagon tailgate, the Truck Cargo Support Outrigger needs to be provided with a means to prevent it from being pushed or swayed sideways. The two adjustable 2"×2"×2"×¼" L shaped anti-sway caps 97A and 97B are provided to prevent side ways movement of the Truck Cargo Support Outrigger (See FIGS. 3, 1, 4, 5, 6, and 9). Due to the various makes and models of vehicles with tailgates, the width of tailgates vary. The Truck Cargo Support Outrigger can be provided with an upper horizontal rail in which its length will match exactly the width of the tailgate on a specific make and model vehicle, thus the L shaped anti-sway caps 97A and 97B can be mounted at the ends of the upper horizontal rail 92. So mounted, one side of each of the L shaped anti-sway caps 97A and 97B is pointed downward over the end edges of the horizontal side of the upper horizontal rail 92 while the other side of said L shaped anti-sway caps 97A and 97B lays flat on the upper face of the horizontal side of the upper horizontal rail 92 (See FIGS. 3 and 4). Cut through one side of each of these two L shaped anti-sway caps 97A and 97B are two parallel 1 7/16" long by ¼" wide slots (slot sets 98A and 98B). These two slot sets 98A and 98B are cut in proper position to align with any two parallel ¼" holes in machine screw hole sets 102A and 102B. The machine screw hole sets 102A and 102B are bored in the vicinity of the left and right ends of the horizontal side of the upper horizontal rail 92 (One set each end) (See FIGS. 3, 4 and 9). There are ten ¼" machine screw holes per each said set 102A and 102B. These machine screw holes in each said set 102A and 102B are positioned parallel to each other, spaced 1" apart on center. The first two parallel holes in either set 102A and 102B are bored ½" (on center) in from the outer ends of the horizontal side of the upper horizontal rail 92. Per these said outermost holes in machine screw hole sets 102A and 102B the two L shaped anti-sway caps 97A and 97B can be mounted on both ends of the top face of the horizontal side of the upper horizontal rail 92 (See FIGS. 1, 4, 9 and 3).

The machine screw sets 100A and 100B (two machine screws per set) are inserted from the bottom face of the horizontal side of the upper horizontal rail 92 through the two outer most parallel holes (tapered for countersinking) in machine screw hole sets 102A and 102B (See FIG. 3). These machine screw sets 100A and 100B are countersunk in the bottom face of the horizontal side of the upper horizontal rail 92 when inserted through the two outer most parallel holes in the machine screw hole sets 102A and 102B. The said machine screw sets 100A and 100B are then inserted through the 1 7/16" long by ¼" wide slot sets 98A and 98B cut in the two L shaped anti-sway caps 97A and 97B. There are two slots per set 98A and 98B and one said set per each said L shaped anti-sway cap 97A and 97B (See FIGS. 3 and 9). A lock washer and nut is then installed on each of the four machine screws that make up machine screw sets 100A and 100B. Per slot sets 98A and 98B, the L shaped anti-sway caps 97A and 97B are pushed up tight against the outer edges of the pickup truck or wagon tailgate (See FIG. 9). Machine screw sets 100A and 100B are then tightened per the installed lock washers and nuts.

The remainder of the machine screw holes that make up machine screw hole sets 102A and 102B are bored parallel to each other at locations along the horizontal side of the upper horizontal rail 92 to approximately match the various widths of the tailgates on the numerous pickup truck and wagon type vehicles sold on the market. Per these remaining machine screw holes in sets 102A and 102B the two L shape anti-sway caps 97A and 97B are mounted to the bottom face of the horizontal side of the upper horizontal rail 92 (See FIGS. 5 and 21). So mounted one side of each of the L shaped anti-sway caps 97A and 97B is pointed downward vertically while the other side is mounted flat against the bottom face of the horizontal side of the upper horizontal rail 92 and pointed outward toward the outer end of the upper horizontal rail 92 (See FIGS. 5 and 21). The machine screws in the machine screw sets 100A and 100B can be, in this case, inserted through the horizontal side of the upper horizontal rail 92 from the top face through to the L shaped anti-sway caps 97A, 97B and then through the slot sets 98A and 98B in the L shaped anti-sway caps 97A and 97B. Per the above mentioned slot sets 98A and 98B in the horizontal positioned sides of the said L shaped anti-sway caps 97A and 97B, the vertically positioned sides of the said L shaped anti-sway caps 97A and 97B can be pushed up snug against the outer edges of the pickup truck tailgate. The lock washers and nuts on the machine screw sets 100A and 100B are then run up tight.

The paralleled holes in the machine screw hole sets 102A and 102B are not in a position to be directly in line with the outside edges of the pickup truck tailgate but positioned slightly outward from the said edges in order that the tailgate will not interfere with placing the lock washers and nuts on the machine screws 100A and 100B. Actually, hexagon head bolts can be used when the L shaped anti-sway caps 97A and 97B are positioned against the bottom face of the horizontal side of the upper horizontal rail 92 because there is no need for countersinking (See FIGS. 5 and 21).

With the L shaped anti-sway caps 97A and 97B mounted in the positions described above, the Truck Cargo Support Outrigger is prevented from swinging left or right due to centrifugal force resulting from the Truck Cargo Support Outrigger being mounted to the rear of a moving vehicle.

The Truck Cargo Support Outrigger that has an upper horizontal rail 92 that is shorter than the width of a particular tailgate on which it is mounted is provided with an anti-sway capability by means of $2'' \times 2'' \times 2'' \times \frac{1}{8}'' \times 12''$ L shaped anti-sway caps 99A and 99B which have one lengthened side each as well as lengthened slot sets 103A and 103B (See FIG. 6). There are two slots per each set 103A and 103B and one said slot set per each lengthened anti-sway cap 99A and 99B. Slot sets 103A and 103B are ¼" wide and 8" long. The slot sets 103A and 103B are cut in the 12" lengthened side of each of the lengthen-ed L shaped anti-sway caps 99A and 99B (See FIG. 6). The 12" lengthened side of each of the lengthened L shaped anti-sway caps 99A and 99B is mounted on the upper horizontal face of the upper horizontal rail 92 and adjusted up snug against the end edges of the vehicle's tailgate the same way the shorter L shaped anti-sway caps 97A and 97B are mounted and adjusted (See FIG. 6). The pickup truck manufactures always attach their tailgate support braces at a point that is short of the very rear edge of the pickup truck (or wagon) tailgate, thus providing ample room for any of the L shaped anti-sway caps 97A, 97B or 99A, 99B to be pushed up snug against the outer end edges of a pickup truck or wagon tailgate (See FIG. 18).

Under some mounting circumstances the outer ends of the upper horizontal rail 92 will have a tendency to bow back away from the vehicle tailgate a small amount. This can occur if the long edge of the lowered vehicle tailgate in which the upper horizontal rail 92 is mounted against is bowed, bent or is simply not a reasonably straight edge. Under this circumstance a slight rearward movement of the outer ends of the upper horizontal rail 92 can sometimes occur when the lock bolt 134 of the bolt lock mechanism (bolt lock mechanism will be explained later) is turned up tight against the center vertical face portion of the upper horizontal rail 92. This condition can, however, be prevented. As an added stabilizing feature for the upper horizontal rail 92, two ¼"×¾" stop bolts 224A and 224B are installed on that side of the L shaped anti-sway caps 97A and 97B that points downward. That is with the L shaped anti-sway caps 97A and 97B mounted to the upper horizontal rail 92. In order to mount the two stop bolts 224A and 224B to the downward pointing side of each of the L shaped anti-sway caps 97A and 97B, two parallel slots are cut horizontaly in the downward pointing side of each of the L shaped anti-sway caps 97A and 97B (See FIGS. 29, 28 and 30). These slots are referred to as slot set 226A which is located on the downward pointing side of the L shaped anti-sway cap 97A and slot set 226B which is located on the downward pointing side of the L shaped anti-sway cap 97B. There are two parallel slots per each slot set 226A and 226B. Each said slot in slot sets 226A and 226B is ¼" wide by ¾" long. The stop bolt 224A is located in either of the two slots in slot set 226A located on the L shaped anti-sway cap 97A. The stop bolt 224B is located in either of the two slots in slot set 226B located on the L shaped anti-sway cap 97B (See FIGS. 28, 29 and 30).

Figure 27:
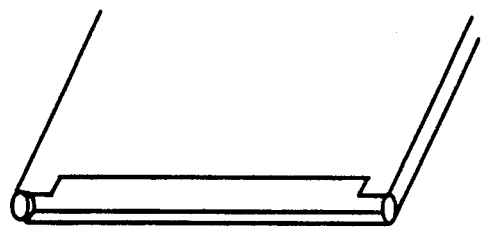
FIG. 27 shows a view of the typical design of the outer end edges of a pickup truck tailgate. The outer end edges are recessed with a over hanging lip.

The two stop bolts 224A and 224B serve the function of stabilizing the outer ends of the upper horizontal rail 92. In other words they will prevent any slight rearward movement of the outer ends of the upper horizontal rail 92. The outer end edges of almost all pickup truck or wagon tailgates are recessed with a encircling, over hanging lip (See FIG. 27). This over hanging lip curls around and encloses the top ends of these outer end tailgate edges as shown in FIG. 27. The two stop bolts 224A and 224B are installed in the slots sets 226A and 226B in such a position that will allow the heads on the stop bolts 224A and 224B to be positioned inside the recessed outer edges of the vehicle tailgate (See FIG. 29). A lock washer and nut are installed on each of the stop bolts 224A and 224B. The stop bolts 224A and 224B are slid in the slot sets 226A and 226B until the head of each of the stop bolts 224A and 224B is up against the curled lip at the point on the tailgate where the long edge of the tailgate meets the two outer short edges of the tailgate (See FIG. 29). The nuts on stop bolts 224A and 224B are at this point tightened. This will prevent the outer ends of the upper horizontal rail 92 from being able to slightly bow back away from the vehicle tailgate. The heads of the two stop bolts 224A and 224B hang on that portion of the above mentioned over hanging lip that curls around and encloses the ends of the outer tailgate edges (See FIG. 29). This prevents any tendency the outer ends of the upper horizontal rail 92 may have to bow slightly rearward. The purpose of there being two slots per sets 226A and 226B is to provide the ability to vary the positions of the stop bolts 224A and 224B. This is so the stop bolt sets 224A and 224B will work on a wide range of tailgates.

The new standard size Chevrolet and GMC pickup trucks require the L shaped anti-sway caps 97A and 97B to be cut as shown in FIG. 31. FIG. 31 depicts part of one side of the L shaped anti-sway caps 97A and 97B cut away. This is the side of the said L shaped anti-sway caps 97A and 97B that points down when the L shaped anti-sway caps 97A and 97B are mounted to the upper horizontal rail 92. It is necessary to cut a narrow ⅜" wide strip off the downward pointing side of the L shaped anti-sway caps 97A and 97B in order that this side will clear a tailgate obstruction and fit up snug against the outward ends of the tailgate on the new standard size Chevrolet and GMC pickups. When this particular trimmed version of the L shaped anti-sway caps 97A and 97B is used for the new standard size Chevrolet and GMC pickups the two stop bolts 224A and 224B and their respective slot sets 226A and 226B are eliminated. They are not needed because the tailgate obstruction referred to above (the tailgate structure itself) on the newly styled Chevrolet and GMC talgates prevents any rearward movement of the L shaped anti-sway caps 97A and 97B and this in turn prevents the outer ends of the upper horizontal rail 92 from bowing rearward.

Pivotal bolt locking mechanism

FIGS. 10, 11, 12, 13, 14 and 15 show a better description of the pivotal bolt lock mechanism. The purpose of the pivotal bolt lock mechanism is to lock or bind the upper horizontal rail 92 in its mounted position on the pickup truck or wagon tailgate. The pivotal bolt lock mechanism prevents the upper hoizontal rail 92 from rotating back and coming off the lowered pickup truck tailgate (See FIGS. 9 and 18). The povital bolt lock mechanism is comprised of a 2"×2"×⅛"×5½" angle aluminun or angle iron lock base 104 which can be mounted at various locations along the middle, upper surface portion of the spar 22 (See FIGS. 10 and 15). The lock base 104 provides a mounting base and securing base for the lock swing 112 (to be described latter) (See FIGS. 10 and 14). As stated the lock base 104 can be mounted at various locations along the upper surface of the spar 22. Since the vertical support assembly will be mounted at different locations along the load support rails 44A and 44B depending on the type of pickup truck or wagon being utilized, the pivotal bolt lock mechanism may have to be moved forward on spar 22 to be in range of the upper horizontal rail 92 of the vertical support assembly or the pivotal bolt lock mechanism may have to be moved rearward on spar 22 due to the vertical support assembly being moved to a more rearward position on the load support rails 44A and 44B. This forward or rearward adjustment of the pivotal bolt lock mechanism is accomplished by two sets of ¼" bolt holes 110A and 110B. These bolt hole sets 110A and 110B are bored center line the top and bottom sides of the hollow box shaped spar 22. There are six said ¼" bolt holes per set 110A and 110B bored through the top side of spar 22 and six said ¼" bolt holes per set 110A and 110B bored through the bottom side of spar 22. This makes a total of twelve ¼" bolt holes per bolt hole set 110A and bolt hole set 110B. These ¼" bolt hole sets 110A and 110B are located in the vicinity of the midsection of spar 22 (precise locations given in description section) (See FIGS. 2, 10, 15 and 1). The lock base 104 has two ¼" bolt holes 108A and 108B, spaced 4½" apart, bored center line the horizontal side of the lock base 104 (precise locations given in description section) (See FIGS. 10, 12, 14 and 15). The two bolt holes 108A and 108B will align with any two of the bolt holes in bolt hole sets 110A and 110B (align with both top and bottom hole per set) and thereby give the pivotal bolt lock mechanism the capability of being anchored down at various locations along the top side of spar 22 (See FIGS. 10, 15 and 1). The two ¼"×2½" bolts 106A and 106B are inserted through ¼" bolt holes 108A, 108B and then inserted through the align holes in ¼" bolt hole sets 110A and 110B (See FIG. 9, 10). One lock washer and nut is installed per each bolt 106A and 106B or per each auxiliary bolt 155A and 155B when they are used (FIG. 15). The lock swing 112 is a 2"×2×⅛×6½ piece of angle aluminum or angle iron which is mounted with its vertical side against the vertical side of the lock base 104 by a ¼×1" bolt 114 (See FIGS. 10, 14 and 15). Bolt 114 includes two flat washers and one lock washer plus said bolt 114 has a safety cotter pin 116 inserted in a 1/16" hole 118 bored ⅛" down from the threaded tip of bolt 114 (See FIGS. 14). Bolt 114, with one flat washer installed, is inserted through the two ¼" bolt holes 120, 122 and then the remaining flat washer, lock washer, nut and safety cotter pin 116 are installed (See FIG. 14). The joint formed is rotatable and the safety cotter pin 116 prevents the nut from coming off bolt 114. Bolt hole 120 is bored through the vertical side of lock base 104, 1 3/16" from said base's rear vertical edge and 9/16" down from said lock base's upper horizontal edge. Bolt 122 is bored through the vertical side of the lock swing 112, 9/16" from the rear vertical edge of said lock swing 112 and 1⅜" down from the upper horizontal edge of said lock swing 112 (See FIG. 14).

As stated earlier the joint formed where bolt 114 fastens lock swing 112 to lock base 104 is rotatable. This rotatable joint is necessary in order that the lock swing 112 may be swung up and rearward away from the upper horizontal rail 92 when said horizontal rail 92 has to be rotated rearward and off the lower pickup truck or wagon tailgate for the purpose of detaching the Truck Cargo Support Outrigger from the truck. When the pivotal bolt lock mechanism is in its in service mode (locked in) the nut on bolt 114 should be run up tight in order to prevent play in said joint. The lock swing 112 is also attached to the lock base 104 at a more forward position by an anchor bolt 138 (to be described later) (See FIGS 10 and 14).

Mounted on the forward end, upper horizontal face of the lock swing 112, is the lock bolt housing 124 (See FIGS. 14, 10 and 15). The lock bolt housing 124 is 2"×2"×⅛"×3" in size, rectangle shaped, hollow, and made of either aluminum or iron. The lock bolt housing 124 is welded in place. The front end of the lock bolt housing 124 is flush with the front horizontal edge of the lock swing 112 (See FIG. 15). Two ¼" bolts could be used to bolt the lock bolt housing 124 to the lock swing 112, however, welding is the preferred method. The metal lock bolt housing 124 serves as a frame to mount the ⅜"×6" threaded lock bolt 134 (See FIGS. 14, 10, 15 and 9).

Bored dead center the front end wall of lock bolt housing 124 is a ⅜" threaded bolt hole 132A (not shown). Bored dead center the rear end wall of the lock bolt housing 124 is ⅜" threaded bolt hole 132B (not shown). Screwed into threaded bolt holes 132A and 132B is one ⅜"×6" threaded lock bolt 134. Installed on lock bolt 134 are four ⅜" nuts 135A, 135B, 135C and 135D (See FIGS. 14). Nut 135A with respective lock washer, is located on the back side of the rear end wall of lock bolt housing 124. Nut 135B, with respective lock washer, is located on the front side of the rear end wall of lock bolt housing 124. Nut 135C, with respective lock washer, is located on the back side of the front wall of lock bolt housing 124. Nut 135D, with respective lock washer, is located on the front side of the front wall of the lock bolt housing 124. The lock bolt 134 can be screwed forward and rearward through the threaded bolt holes 132A and 132B located in the lock bolt housing 124. The purpose being to utilize lock bolt 134 to push the upper horizontal rail 92 up tight against the lowered pickup truck or wagon tailgate and hold it there by screwing lock bolt 134 forward (See FIGS. 10, 9 and 18). The ⅜" nuts 135A, 135B, 135C and 135D which are mounted on lock bolt 134 are then screwed in tight against the front and rear walls of the lock bolt housing 124. This secures lock bolt 134 in whatever position is needed.

Having the ⅜" nuts 135A, 135B, 135C and 135D located on both sides of the front and rear walls of the lock bolt housing 124, in addition to securing lock bolt 134, prevents the said walls from being pushed in or bent as might be the case if only one said ⅜" nut was used and tightened against each said wall. The pressure from one nut pushing against each of the end walls of the lock bolt housing 124 might bend the walls if over tightened, thus a nut is used on bolt sides of said walls. To release pressure off the upper horizontal rail 92 and also the pivotal bolt lock mechanism, the nuts 135A, 135B, 135C and 135D are loosened and lock bolt 135 is simply screwed rearward. By releasing pressure, the anchor bolt 138 can be pulled and the lock swing 112 can be rotated back away from the upper horizontal rail 92. The anchor bolt 138, used in conjunction with the lock swing 112, is ¼"×4" and is threaded for a length of approximately 1" down from its tip end (See FIGS. 14, 13 and 10). The purpose of anchor bolt 138 is to secure the more forward end of lock swing 112 to a more forward point on the lock base 104. A ¼" stop nut 126 is screwed down tight to the last thread on anchor bolt 138 (See FIG. 13). The anchor bolt 138 is then inserted into the ¼" bolt hole 144 bored through the vertical side of the lock swing 112 (See FIGS. 11, 14 and 10). Bolt hole 144 is bored 1½" down from the top edge of the vertical side of lock swing 112 and 3 11/16" rearward from the front end of the vertical side of the lock swing 112. Anchor bolt 138 is then inserted through one of three ¼" bolt holes that make up bolt hole set 146 (See FIGS. 12, 14 and 10). Bolt hole set 146 is bored in a slight arc up the vertical side of the lock base 104 approximately 2¼" from the front end of lock base 104. A lock washer and another ¼" nut 128 is installed on anchor bolt 138. Nut 128 is run up tight, thus pulling the stop nut 126 tight against the vertical face of the lock swing 112. This in turn pulls the lock swing 112 tight against the lock base 104 (See FIG. 13). This provides a wobble and play free lock swing 112. The anchor bolt 138 is purposely 4" long in order to extend it out to a point whereby it can be easily grasp by an individuals fingers for the purpose of removal and insertion.

Anchor bolt 138 also includes a safety pull pin 140 which is inserted into a 1/16" safety pull pin hole 142 bored ¼" down from the threaded tip of said anchor bolt 138 (See FIGS. 13 and 14). The safety pull pin 140 serves to insure that the nut 128 on anchor bolt 138 does not accidentally come off while the pivotal bolt lock mechanism is in use.

As the front end of lock swing 112 is raised or lowered the anchor bolt 138, while inserted through bolt hole 144, can be aligned with any one of the three bolt holes in bolt hole set 146, bored in lock base 104, as described above (See FIGS. 14, 12, 11 and 15). This allows the lock swing 112 to be anchored in any one of three separate angles. This ability allows the angle at which the lock bolt 134 meets the vertical face of the upper horizontal rail 92 to be changed or corrected to as close a perpendicular position to the vertical side of the upper horizontal rail 92 as possible. The three bolt holes in set 146 are bored in a slight arc to accommodate the arched path made by the bolt hole 144 (located in lock swing 112 as described above) as the front end of lock swing 112 is either raised up or down to the three different positions of the three bolt holes in bolt hole set 146 located in lock base 104.

With the lock swing 112 anchored at two points to lock base 104, the big ⅜"×6" lock bolt 134 can then be screwed up tight against the upper horizontal rail 92 (See FIGS. 9 and 10). The pivotal bolt lock mechanism should be mounted on the upper face of spar 22 as close as practical to the upper horizontal rail 92 per the bolt hole sets 110A and 110B located in spar 22 as described earlier (See FIGS. 10, 18 and 9). The actual tight fit of the pivotal bolt lock mechanism against the upper horizontal rail 92 is accomplished by screwing lock bolt 134 up tight against the upper horizontal rail 92. As described earlier the nuts 135A, 135B, 135C and 135D are screwed up tight in their proper positions thus preventing lock bolt 134 from screwing rearward and allowing the upper horizontal rail 92 to loosen. Actually the lock bolt 134 is sufficiently secured in position with the use of only two of said ⅜" nuts, both being screwed up tight against either the front or rear wall of the lock bolt housing 124. The remaining two said ⅜" nuts can be used as simply an added safety measure.

As the height of the upper horizontal rail 92 above the pivotal bolt lock mechanism is adjusted up or down to accommodate size differences in the various styles of vehicles, so must the height of the pivotal bolt lock mechanism be adjusted above spar 22. Ideally the lock bolt 134 should meet the vertical face of the upper horizontal rail at a perfect right angle. This can be more closely achieved by adding to the height of the pivotal bolt lock mechanism above the spar 22. A wooden 2"×2½"×5½" block 151 can be placed between the lock base 104 and spar 22, thus giving the pivotal bolt lock mechanism added height if need be (See FIG. 15). The bolt holes 153A and 153B (not shown) in the wooden block 151 match the bolt holes 108A and 108B in the lock base 104 (See FIG. 15). The pivotal bolt lock mechanism and the wooden block 151 in this case are secured in place on spar 22 by two ¼"×4½" auxiliary bolts 155A and 155B. As described earlier the ¼"×2½" bolts 106A and 106B anchor the lock base 104 to the spar 22 when the wooden blocking is not used. The thickness of the wooden blocking can be varied. Additional minor adjustment to the angle in which the lock bolt 134 meets the vertical face of the upper horizontal rail 92 can be made by bolting the more forward portion of the lock swing 112 at any one of the three positions provided by the three bolt holes that make up the already described bolt hole set 146 (See FIGS. 14, 10, 11, 12, 13 and 15). The wooden block 151 can also be tapered in thickness toward its rear end in order to give the pivotal bolt lock mechanism a more perpendicular position relative to the upper horizontal rail 92 (See FIGS. 15). With some added bolt holes the lock swing 112 can actually be flipped over so its vertical side is pointed downward and with the lock bolt housing 124 mounted on what would now be the upper horizontal face of the lock swing 112. The pivotal volt lock mechanism would in this case have greater height and would be assembled as shown in FIG. 32. Wood blocking, however, allows greater flexibility in varying the height.

A 2"×2"×¼" metal lock bolt receiver plate 147 is welded to the rear vertical face of the upper horizontal rail 92 in such a position as to be aligned with the tip end of lock bolt 134 (See FIGS. 10 and 9). When the lock bolt 134 is screwed up tight against the vertical face of the upper horizontal rail 92 its tip end will be in either one of two 11/16" holes 149A and 149B bored through the lock bolt receiver plate 147 (See FIGS. 10 and 9). The purpose of the lock bolt receiver plate 147 is to stabilize the mating of the tip end of the lock bolt 134 to the vertical face of the upper horizontal rail 92. As a rule under most vehicle mounting situations the lock bolt 134 will not meet the vertical face of the upper horizontal rail 92 at a perfect right angle and the lock bolt receiver plat 147 will prevent the tip end of the lock bolt 134 from slipping slightly across the vertical face of the upper horizontal rail 92 as pressure is applied by screwing the lock bolt 134 up tight. The purpose of having the two 11/16" holes 149A and 149B in the lock bolt receiver plat 147 instead of one is simply to provide an added alignment point for easier alignment of the lock bolt 134 with the lock bolt receiver plate 147 (See FIGS. 10 and 9).

FIGS. 22 and 18 show a better description of the anti-bounce bumper. The anti-bounce bumper is designed to prevent the vertical movement or bouncing of the upper horizontal rail 92 on a vehicles lowered tailgate by pressing against the lower face of a lowered tailgate (See FIGS. 18). The anti-bounce bumper is mounted on spar 22 through any two of the six ½" threaded bolt holes that make up bolt hole set 167 bored center line the top and bottom sides of spar 22 (three holes top side and three holes bottom side to make a set of six holes). This bolt hole set 167 is located on spar 22 between the vertical support assembly and the trailer hitch coupler 20. This is the area immediately under the lowered face of the lowered pickup truck tailgate (See FIGS. 18 and 2). The threaded bolt hole set 167 provides the anti-bounce bumper with three different locations along spar 22 to be mounted in order to better accommodate different style and size tailgates. The ½"×10" bumper bolt 169 with a ½" nut 171A, including one lock washer placed on it, is screwed through one of the top threaded bolt holes that make up bolt hole set 167 and then screwed through one of the aligned bottom bolt holes that also make up said bolt hole set 167. A ½" nut 171B with a lock washer is then screwed on the lower end of bumper bolt 167 (See FIGS. 22 and 18). The bumper bolt 169 can be screwed to whatever vertical height is needed above spar 22 and then secured in position by screwing the ½" nuts 171A and 171B tight against spar 22.

A 3/16" pin hole 173 (See FIGS. 22) is bored ¼" down from the threaded tip of bumper bolt 169. Mounted on the tip of bumper bolt 169 is a 2"×2"×1×1/16" bumper base 175 made of either channel iron or channel aluminum (See FIG. 22). Bored dead center both vertical sides of the bumper base 175 are two 3/16" pin holes 177A and 177B, one said pin hole per each side (See FIG. 22). A 2¾"×3/16" pin 179 is inserted through pin hole 177A and then through pin hole 173 in bumper bolt 169 and then through pin hole 177B. Pin 179 has a 1/16" cotter pin hole 181 bored 3/16" down from its tip end. A flat washer is slipped over the tip of pin 179 and a cotter pin 183 is inserted through cotter pin hole 181 thus securing pin 179 in position (See FIG. 22). The other end of pin 179 has a flat head. Pin 179 secures bumper bolt 169 to bumper base 175. The joint formed is rotatable, thus the 2"×2"½" rubber bumper 185 attached to the bumper base 175 (See FIG. 22) can remain flat against the lower face of the lowered tailgate regardless of the angle of the bumper bolt 169 to the lower face of the vehicles lowered tailgate (See FIG. 18). The rubber bumper 185 is attached to the bumper base 175 by two ½"×¾" countersunk machine screws 187A and 187B (See FIG. 22).

The rubber bumper 185 is pressed against the lower face of a lowered tailgate by turning bumper bolt 169 through the already described threaded bolt holes of bolt hole set 167. Upon proper adjustment of bumper bolt 169, nuts 171A and 171B, as stated earlier, are screwed tight against the upper face and bottom face of spar 22 to prevent bumper bolt 169 from turning farther (See FIG. 18).

FIGS. 9, 18, 19, 20, 23, 24, 25 and 26 show a better description of a load reliever feature of the Truck Cargo Support Outrigger. Two ten foot 2/0 double twist load reliever chains 189A and 189B can be used in order to provide added support for the Truck Cargo Support Outrigger. Bored center line the horizontal side of the load support rails 44A and 44B, set 1½" in from the rear ends of the load support rails 44A and 44B, are two ⅜" eye bolt holes 191A and 191B (not shown). There is one said hole per each load support rail 44A and 44B. Inserted in these two eye bolt holes 191A and 191B are ⅜"×2" threaded eye bolts 193A and 193B (See FIGS. 20 and 18). The eye part of the eye bolts 193A and 193B is positioned downward and under the lower horizontal face of the horizontal side of the load support rails 44A and 44B. Lock washers and nuts are installed on each eye bolt 193A, 193B and tightened. Inserted through the eyes of eye bolts 193A and 193B are ⅜"×8" threaded eye bolts 195A and 195B (threaded their entire length) (See FIGS. 20 and 18). The eye portion of these eye bolts 195A and 195B are positioned on the front side or truck side of the eye bolts 193A and 193B. A large flat washer and ⅜" nut is installed on the other ends of the eye bolts 195A and 195B. These said ⅜" nuts are referred as nuts 194A and 194B (See FIGS. 20 and 18). These nuts 194A and 194B can be used to adjust the ⅜"×8" eye bolts 195A and 195B forward or rearward through the eyes of the eye bolts 193A and 193B. Nut 194A is located on eye bolt 195A and nut 194B is located on eye bolt 195B.

Attached to the eye of each of the eye bolts 195A and 195B is a link of the two 10 foot 2/0 double twist chains 189A and 189B (Whichever link will result in the most slack being pulled out of said chains) (See FIGS. 20, 18 and 9). The forward ends of these same two said chains 189A and 189B have snap hooks 197A and 197B (one snap hook per each said chain) attached to their last forward most links (See FIGS. 20 and 21). The snap hooks 197A and 197B are hooked to the pickup truck tailgate latch strikes (See FIGS. 19 and 9). The slack is pulled out of the chains 189A and 189B by running up the nuts 194A and 194B located on the threaded eye bolts 195A and 195B (See FIG. 20). Assembled in this manner, the load reliever chains 189A and 189B can be tightened and thus lift the weight of a load off the pickup truck tailgate (See FIGS. 18 and 9).

Figure 25:
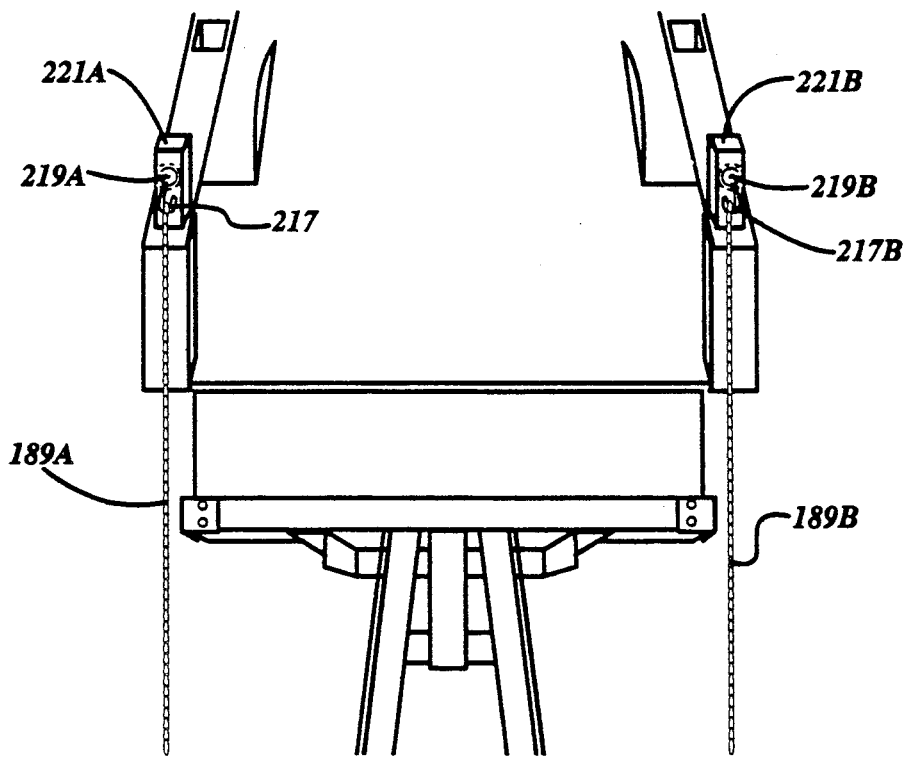
FIG. 25 shows the two vertical stakes 221A and 221B mounted in the rear stake holes in the vertical sides of the pickup truck cargo bed. The vertical stakes 221A and 221B serve as attachment points for the forward ends of the load reliever chains 189A and 189B.

The forward ends of the load reliever chains 189A and 189B can also be attached to wooden or medal post placed in the rear stake holes in the vertical sides of the pickup truck bed (See FIG. 25). These post 221A and 221B are capable of providing a more sturdy anchor point for the forward ends of the load reliever chains 189A and 189B to the pickup truck than can be provided by the tailgate latch strikes. These post 221A and 221B have mounted through ⅜" holes, located in their upper ends, two ⅜"×8" eye bolts 217A and 217B (See FIG. 25). These threaded eye bolts 217A and 217B are identical to the already described eye bolts 195A and 195B mounted to the rear of the Truck Cargo Support Outrigger. Threaded eye bolts 217A and 217B are used as attachment points for the forward ends of the load reliever chains 189A and 189B to the rear of the pickup truck. Threaded eye bolts 217A and 217B are also used to pull the slack out of the load reliever chains 189A and 189B by running the nuts 219A and 219B up toward the eye portion of the said eye bolts 217A and 217B (See FIG. 25). These two ⅜"×8" eye bolts 217A and 217B are used in conjunction with the two ⅜"×8" eye bolts 195A and 195B which are, as described earlier, attached to the rear end of the two load support rails 44A and 44B (See FIG. 18). The rear ends of the load reliever chains 189A and 189B are attached to the eye bolts 195A and 195B while the forward ends of said chains are attached to the just described eye bolts 217A and 217B per the already mentioned snap hooks 197A and 197B or simply by one of the forward links in each of the said chains 189A and 189B (See FIG. 25).

Since some pickup trucks, primarily small imported pickup trucks, do not have stake holes incorporated into the vertical sides of their truck beds another method can be used as a chain anchor point. This method utilizes a high board 215 (See FIGS. 23 and 24) or a low board 223 (See FIG. 26). The high board 215 is a 2"×6" piece of lumber in which the ends are formed to conform to the upper inside walls and top edges of the vertical sides of the pickup truck bed (See FIGS. 23 and 24). The high board 215 is mounted to the rear of the pickup truck as shown in FIG. 23. Mounted through ⅜" holes located in the vicinity of the ends of the high board 215 are the two ⅜"×8" eye bolts 217A and 217B (See FIGS. 24). These said eye bolts 217A and 217B serve as attachment points for the forward ends of the load reliever chains 189A and 189B. The accompanying nuts 219A and 219B, including washers, can, as stated earlier, be run up toward the eye portion of the eye bolts 217A and 217B and thus aid in pulling the slack out of the load reliever chains 189A and 189B and thereby lift the weight off the pickup truck tailgate. The rear right angled ends of the vertical sides of the pickup truck bed prevents the high board 215 from pulling off the truck (See FIG. 23).

When it is necessary to haul a load or structure that will have to occupy the space normally occupied by the high board 215, the wooden two by four (2"×4") low board 223 can be substituted (See FIG. 26). The low board 223 is rigged with the same ⅜"×8" eye bolts 217A and 217B to serve the same purpose as they serve on the vertical post 221A and 221B and also on the high board 215. The low board 223 lays on the rear of the pickup truck bed with its outer ends extended behind the rear most ends of the vertical sides of the pickup truck bed as shown in FIG. 26. The rear right angled ends of the vertical sides of the pickup truck bed hold the low board on the truck.

When the slack is pulled out of the load reliever chains 189A and 189B and a good deal of tension is applied, the load reliever chains 189A and 189B have a tendency two bow the rear most portion of the load support rails 44A and 44B outward if the rear support cross brace 145 is in a raised position on the two threaded rods 157A and 157B (See FIG. 9). In other words this is the case if the rear support cross brace 145 is positioned well above the two load support rails 44A and 44B (roughly 6" or 8" or more) per the threaded rods 157A and 157B. In order to prevent this outward bowing of the rear portion of the two load support rails 44A and 44B a 2/0 double twist brace chain 198 is strung between the rear ends of the two load support rails 44A and 44B (See FIG. 9). Each end of the 2/0 double twist brace chain 198 is attached to each of the previously described ⅜"×2" threaded eye bolts 193A and 193B that are attached to the rear portion, horizontal side, of the load support rails 44A and 44B (See FIG. 20). The last link on each end of brace chain 198 is attached to the eye portion of the eye bolts 193A and 193B (See FIGS. 1, 20 and 21). As tension is applied to the load reliever chains 189A and 189B the brace chain 198 will prevent the outward bowing of the rear portion of the load support rails 44A and 44B. The brace chain 198 is approximately 45" long on the Truck Cargo Support Outrigger that has six foot load support rails 44A and 44B and approximately 52″ long on a Truck Cargo Support Outrigger that has eight foot load support rails 44A and 44B.

As one can now see the Truck Cargo Support Outrigger has a number of mechanisms that have the capability of being adjusted. Once these various mechanisms on the Truck Cargo Support Outrigger have been adjusted in position to fix a particular type of pickup truck or wagon type vehicle (wagon vehicle with a drop down tailgate) the Truck Cargo Support Outrigger can continue to be quickly mounted and disconnected from that particular vehicle without the need for any further adjustments. That is, no further adjustments other than locking or unlocking the bolt lock mechanism and tightening or loosening the load reliever chains 189A and 189B. The adjustable L shaped anti-sway caps 97A and 97B can remain tightened in position without any further need for a position change unless the stop bolts 224A and 224B are being utilized on the L shaped anti-sway caps 97A and 97B. In this case one said L shaped anti-sway cap will need to be loosened in order to provide enough play for the heads on the stop bolts 224A and 224B to clear the tailgate when the upper horizontal rail 92 is being dismounted from the tailgate. Also if lighter materials are being hauled such as plastic pipe, roof gutters or house trim etc., the load reliever chains 189A and 189B generally will not be required simply because a pickup truck or wagon tailgate can handle the weight of these materials or similar materials without the assistance of the load reliever chains 189A and 189B.

Partial wood version of the Truck Cargo Support Outrigger

Previously discussion has dealt with the Truck Cargo Support Outrigger being constructed entirely of steel (the rear support cross brace 145 being the exception). In order to reduce the cost of construction and weight, some major structural members of the Truck Cargo Support Outrigger can be constructed out of wood and the Truck Cargo Support Outrigger can still remain structurally very strong (See FIGS. 21 and 16). The trailer hitch coupler 20 is assembled to the wooden spar 22 as described in the description section on page 54 (See FIGS. 21 and 16).

The method referred to gives the front end of the 2″×4″×37″ wooden spar 22 the strength to prevent splitting and provides for a strong and free from play attachment of the trailer coupler hitch 20 to the forward end of spar 22.

Attaching the two wooden 2″×4″×8′ load support rails 44A and 44B to the wooden spar 22 is accomplished by eliminating the front cross brace 36, mitering the forward ends of the wooden load support rails 44A and 44B and attaching them to the two opposite vertical sides of the wooden spar 22 as described in the description section on page 55, 56 and 57 (See FIG. 21).

The rear end of the wooden two by four (2″×4″) spar 22 is attached to a wooden two by four (2″×4″) middle cross brace 46 as described on page 57 in the description section (See FIG. 21). The wooden two by four (2″×4″) middle cross brace 46 is 20″ long and attached at its outer ends to the two by four (2″×4″) load support rails 44A and 44B as described on page 57 in the description section. The assembly and attachment technique (spar 22 to middle cross brace 46, middle cross brace 46 to load support rails 44A and 44B) is the some as previously described for the all steel model of the Truck Cargo Support Outrigger.

The above described assembly and attachment method for the partial wooden model of the Truck Cargo Support Outrigger provides a very strong, tight and free of play structure (See FIGS. 21 and 16).

Anti-bounce capability for the partial wooden model of the Truck Cargo Support Outrigger is provided by a anti-bounce mechanism that is very similar to the one described on pages 47 and 48 in the description section for the all steel model of the Truck Cargo Support Outrigger (See FIGS. 16 and 17). The purpose of the anti-bounce bumper is to prevent the upper horizontal rail 92 of the vertical support assembly from vibrating or bouncing while mounted to a lowered tailgate. The bumper bolt 169 of this anti-bounce bumper mechanism on the all steel model of the Truck Cargo Support Outrigger is mounted through the steel spar 22, however, on the partial wooden model of the Truck Cargo Support Outrigger the anti-bounce bumper mechanism is not mounted on the spar 22 (See FIGS. 16, 17 and 21). A $\frac{1}{4}″\times10″$ threaded steel bumper rod 170, with the bumper base 175 and rubber bumper 185 mounted to one end, is mounted through one of four $\frac{1}{4}″$ rod holes that make up $\frac{1}{4}″$ rod hole set 174. The rod hole set 174 is bored through a piece of $1\frac{1}{2}″\times1\frac{1}{2}″\times\frac{1}{4}″\times6\frac{1}{4}″$ angle iron that serves as bumper rod base 172 (See FIGS. 16 and 17). This bumper rod base 172 is either welded or bolted to the base rail 72, $5\frac{1}{2}″$ (the distance can vary) from the right end of base rail 72 (front of outrigger looking to rear) (See FIGS. 16 and 21).

The bumper rod base 172 protrudes forward under the lowered pickup truck tailgate. The four $\frac{1}{4}″$ rode holes in rod hole set 174 are bored center line the horizontal side of bumper rod base 172, spaced 1″ on center (See FIG. 17). The edge of the first $\frac{1}{4}″$ rod hole in rod hole set 174 is placed $\frac{1}{4}″$ from the forward end of bumper rod base 172. These said four $\frac{1}{4}″$ rod holes serve to provide four different mounting locations for the $\frac{1}{4}″\times10″$ threaded bumper rod 170 (See FIG. 17). The rod holes in this rod hole set 174 are not threaded.

The bumper rod 170 is threaded its entire length and has the bumper base 175 and rubber bumper 185 mounted on one end the same way they are assembled and mounted on the bumper bolt 169 described for the all steel model of the Truck Cargo Support Outrigger on page 48 of the description section. The bumper rod 170 is inserted vertically into any one of the four $\frac{1}{4}″$ rod holes that make up rod hole set 174 bored in the bumper rod base 172 (See FIGS. 16, 17 and 21). The four $\frac{1}{4}″$ rod holes in rod hole set 174 allow the position of the rubber bumper 185 to be varied in order that it may be suitably positioned to press against the lower face of the different varieties of truck tailgate (This is with the tailgate in its lowered position).

The up and down adjustment of the bumper rod 170 is accomplished by sliding the said bumper rod 170 either up or down through the bumper rod holes in set 174 bored in the bumper rod base 172. A $\frac{1}{4}″$ nut 171A located on bumper rod 170 (lock washer included) is screwed down against the upper face of the bumper rod base 172. Another $\frac{1}{4}″$ nut 171B (lock washer included) is screwed onto the lower end of bumper rod 170. The $\frac{1}{4}″$ nut 171B is screwed up tight against the bottom face of the bumper rod base 172 (See FIG. 16). The bumper rod 170 is thus mounted in its vertical position and held firm at the correct height. The correct height is such that the rubber bumper 185 is up snug against the lower face of the lowered pickup truck tailgate. This prevents the upper horizontal rail 92 of the vertical support assembly from vibrating and bouncing up and down on the tailgate.

The remainder of the construction technique of this partial wooden model of the Truck Cargo Support Outrigger remains the same as that of the all steel version of the Truck Cargo Support Outrigger. All the components of the vertical support assembly and the pivotal bolt lock mechanism remain steel. However, 1½"×1½"×⅛" angle iron or angle aluminum is used for the vertical support assembly on the partial wood model of the Truck Cargo Support Outrigger. This is instead of the 2"×2"×¼" angle iron or angle aluminum used for the vertical support assembly on the all steel model of the Truck Cargo Support Outrigger. Also the threaded rods 157A and 157B that the rear support cross brace 145 is mounted on are ½" in diameter on the partial wood model of the Truck Cargo Support Outrigger rather than ⅝" in diameter as they are on the all steel model of the Truck Cargo Support Outrigger. The rod hole sets 159A and 159B which are bored in the horizontal side of the load support rails 44A and 44B are ½" in diameter on the partial wood version of the Truck Cargo Support Outrigger rather than ⅝" in diameter as they are on the all steel version of the Truck Cargo Support Outrigger. The same applies to the rod hole sets 163A and 163B which are bored in the rear support cross brace 145 on the partial wood version of the Truck Cargo Support Outrigger. Also the ⅝" eye bolts 193A and 193B are extended in length to 4½ on the partial wood version of the Truck Cargo Support Outrigger. The two ¼" bolts 76A, 76B are extended in length to 5". The dimensions of the steel component parts of the pivotal bolt lock mechanism are the same for the partial wood model of the Truck Cargo Support Outrigger as they are for the all steel model of the Truck Cargo Support Outrigger.

Thus the reader will see that the Truck Cargo Support Outrigger provides a easy and quick to attach and remove material support device for the do-it-yourselfer who is a pickup truck owner or owner of one of the older model wagon type vehicles. The wagon type vehicles, of coarse, have to be the type with a drop down tailgate. The drop down tailgate on the wagon type vehicles is on the older models such as the older model Ford Broncos and Chevrolet Blazers etc. Professional tradesmen would also, on occasion, find the Truck Cargo Support Outrigger to be a beneficial load support aid. The Truck Cargo Support Outrigger as a structure has a lot of strength, is light weight and when mounted on a vehicle is very sturdy. While mounted it will not rattle or shake loose, thus allowing the transportation of long materials or structures without the risk of such being dropped in the street. The Truck Cargo Support Outrigger provides the do-it-yourselfer with an alternative pickup truck material support device to the rather unsightly, permanent elevated steel over bed, over cab racks utilized by the professional tradesman. The Truck Cargo Support Outrigger is a load support device that can be attached to any pickup truck without the need for drilling holes in the pickup truck or modifying the pickup truck in any way other than mounting a trailer hitch. The same applies to those wagon type vehicles that the truck Cargo Support Outrigger can be suitably mounted on. Once the various mechanism on the Truck Cargo Support Outrigger have been adjusted in position to fit a particular type of pickup truck or wagon type vehicle (wagon type vehicle with a drop down tailgate) the Truck Cargo Support Outrigger can continue to be quickly mounted and disconnected from that particular vehicle without the need for any further adjustments other than locking or unlocking the pivotal bolt lock mechanism and tightening or loosening the load reliever chains 189A and 189B. The adjustable L shaped anti-sway caps 97A and 97B can remain tightened in position without any further need for a position change unless the stop bolts 224A and 224B are being utilized on the L shaped anti-sway caps 97A and 97B. In this case one said L shaped anti-sway cap will need to be loosened in order to provided enough play for the heads on the stop bolts 224A and 224B to clear the tailgate when the upper horizontal rail 92 is being dismounted from the tailgate. Also if lighter materials are being hauled such as plastic pipe, roof gutters or house trim etc. the load reliever chains 189A and 189B generally will not be required simply because the pickup truck or wagon tailgate can handle the weight of these materials or similar materials without the assistance of the load reliever chains 189A and 189B. For the purpose of road safety electrical taillights and turn signals are mounted to the rear of the Truck Cargo Support Outrigger. Also a bright colored flag is attached to the rear end of each of the load support rails 44A and 44B.

While the description contains many specificities, the reader should not construe these as limitations on the scope of the invention, but merely as exemplifications of preferred embodiments thereof. For example skilled artisans can change the dimensions and shapes of the various embodiments. They can make variations in the adjustment ranges and in adjustment methods. For example the adjustment bolt hole sets 70A and 70B could be eliminated and elongated slots substituted and used in conjunction with the slot sets 74A and 74B which have already been described in the text. This would allow forward or rearward adjustments of the vertical support assembly to be made by a sliding action rather than removing bolts and rebolting at a different locations. A properly formed on piece steel collar could be used to secure the two wooden load support rails 44A and 44B to the spar 22. Farther, the trailer hitch coupler could be eliminated with spar 22 being designed to allow it to be easily bolted to a pickup truck's bumper. With some design changes in the Truck Cargo Support Outrigger, the upper horizontal rail 92 could be attached to a pickup truck tailgate with the tailgate in its vertical position thus allowing cargo being hauled to rest on the upper edge of the raised tailgate and also be supported by the rear support cross brace 145 at a point well beyond the tailgate. Accordingly, the scope of the invention should be determined not by the embodiments illustrated, but by the appended chains and their legal equivalents.

I claim:

1. An article of manufacture for providing outboard support for long pieces of cargo extending outward of a rear of a cargo bed of a pickup truck, the pickup truck having a tailgate, the article comprising:

a rearward protruding means connected to said rear, below a level of said bed, wherein the rearward protruding means protrudes rearward a number of feet away from said bed and said tailgate, and provides a support for a portion of said cargo which extends from said bed rearward beyond a support for said cargo of said bed; and an upward protruding means which protrudes upward from connecting points thereof with said rearward protruding means, and which is adapted, due to a point thereof of contact with the pickup truck, of providing vertical support and lateral stability to the rearward protruding means, and wherein the upward protruding means comprises structural parts for contact with said tailgate.

* * * * *